United States Patent
Rajnik et al.

[11] Patent Number: 6,077,436
[45] Date of Patent: *Jun. 20, 2000

[54] DEVICE FOR ALTERING A FEED STOCK AND METHOD FOR USING SAME

[75] Inventors: Lawrence S. Rajnik, Corning; Dell J. St. Julien, Watkins Glen; Yuming Xie, Painted Post, all of N.Y.

[73] Assignee: Corning Incorporated, Corning, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/781,996

[22] Filed: Jan. 6, 1997

[51] Int. Cl.⁷ .......................... B01D 53/22; B01D 71/02
[52] U.S. Cl. ................ 210/650; 210/321.82; 210/433.1; 210/502.1; 210/504; 210/510.1; 55/523; 55/524; 95/54; 95/273; 96/4; 502/527.18; 502/527.19
[58] Field of Search ................ 210/247, 433.1, 210/456, 502.1, 504, 510.1, 650, 763, 321.82; 55/523, 524; 502/402, 430, 435, 438, 439, 527, 527.18, 527.19; 422/172, 176, 177, 180; 95/273, 54; 96/4

[56] References Cited

U.S. PATENT DOCUMENTS

| | | |
|---|---|---|
| 3,885,977 | 5/1975 | Lachman et al. . |
| 4,222,874 | 9/1980 | Connelly .................... 210/650 |
| 4,399,052 | 8/1983 | Sugino ...................... 264/29.1 |
| 4,518,704 | 5/1985 | Okabayashi et al. ............ 264/122 |
| 4,739,826 | 4/1988 | Michelfelder et al. .......... 422/180 |
| 4,758,272 | 7/1988 | Pierotti et al. ............... 55/523 |
| 4,781,831 | 11/1988 | Goldsmith .................. 210/247 |
| 4,877,766 | 10/1989 | Frost ....................... 502/439 |
| 4,935,042 | 6/1990 | Sudo et al. .................. 55/523 |
| 4,992,233 | 2/1991 | Swaroop et al. . |
| 5,009,781 | 4/1991 | Goldsmith .................. 210/247 |
| 5,108,601 | 4/1992 | Goldsmith .................. 210/247 |
| 5,260,035 | 11/1993 | Lachman et al. ............. 422/180 |
| 5,403,480 | 4/1995 | Sugimoto .................. 210/510.1 |
| 5,416,057 | 5/1995 | Lipp et al. ................. 502/439 |
| 5,427,601 | 6/1995 | Harada et al. ............... 422/174 |
| 5,451,444 | 9/1995 | DeLiso et al. ............... 502/527 |
| 5,454,947 | 10/1995 | Olapinski et al. ............ 210/510.1 |
| 5,512,250 | 4/1996 | Betta et al. ................ 422/173 |
| 5,607,586 | 3/1997 | Grangeon et al. ............. 210/510.1 |
| 5,641,332 | 6/1997 | Faber et al. ................. 55/523 |
| 5,750,026 | 5/1998 | Gadkaree et al. ............. 210/502.1 |
| 5,846,641 | 12/1998 | Abeles et al. ................ 55/523 |
| 5,853,459 | 12/1998 | Kuwamoto et al. ............. 55/523 |
| 5,855,781 | 1/1999 | Yorita et al. ................ 210/321.82 |
| 5,989,420 | 11/1999 | Sugimoto .................. 210/222 |

FOREIGN PATENT DOCUMENTS

| | | |
|---|---|---|
| 0 352 015 | 1/1990 | European Pat. Off. . |
| 0 778 074 A2 | 6/1997 | European Pat. Off. . |
| 2061933 | 6/1971 | France . |
| 3501941 | 7/1986 | Germany . |
| 4324347 | 1/1994 | Germany . |
| 8807398 | 10/1988 | WIPO . |
| 9307959 | 4/1993 | WIPO . |

*Primary Examiner*—John Kim
*Attorney, Agent, or Firm*—L. Rita Herzfeld

[57] ABSTRACT

A device for altering a feed stock is made of a structure for passage of a feed stock. The structure can be either an extruded unibody structure, or a nested structure. The structure has an interior and an exterior section, and a longitudinal axis, and walls defining two sets of open-ended passages which extend along the longitudinal axis. The two sets of passages have different cross sectional shapes or dimensions with respect to each other. When the structure is nested, at least one set of channels have a cross section in the shape of truncated arcs. A method for making the unibody structure involves extruding a plasticized raw material mixture through a die, followed by heat-treating. A method of altering a feed stock which involves passing a feed stock into the device through one set of passages to cause an altering of the feed stock, and thereafter passing the output stream into and through the other set of channels to the exterior of the device.

13 Claims, 21 Drawing Sheets

DEVICE FOR ALTERING A FEED STOCK AND METHOD FOR USING SAME

This invention relates to fluid-altering devices having either extruded unibody structure or a nested structure having passages in the shape of truncated arcs. The devices are superior in providing low back pressure and high flux per unit area and are especially useful as membrane supports. This structure can be used in filtration or separation of gases or liquids, or for other reactions.

BACKGROUND OF THE INVENTION

Extruded ceramic tubes or monoliths are used for the filtration and separation of gasses and liquids. Such uses include the filtering of beer to remove active yeast and the filtering of water to remove particulate matter. Another use for ceramic bodies is in the separation of gas mixtures, such as the separation of hydrogen from methanol. An example of a body useful for this application is an extruded and fired alumina or mullite tube containing a zeolite membrane. A further improvement of this is to use an extrudate containing a multiplicity of cylindrical channels oriented parallel to the direction of the extrusion (typically the long axis). Typically seven, eleven, nineteen, twenty-eight, thirty-one, or thirty-seven parallel cylindrical channels are arranged in a hexagonal manner or in increasing concentric rings as shown in FIGS. 1 and 1a as a and c.

The liquid or gas which has passed through the filter is commonly referred to as the filtrate or permeate. One difficulty with this geometry is that the filtrate must travel a relatively long and tortuous path from any interior channel (e.g. channel a in FIG. 1a) to the exterior of the extrudate (e.g. b in FIG. 1a). Channels near the exterior (e.g. channel c in FIG. 1a) also suffer interference from the permeate from the interior channels. As a result, when more than one cylindrical channel, or more than one ring of channels is present, there can be a high back pressure and a reduced flux of filtrate per unit area of filter. The present invention alleviates this difficulty.

Often the extruded body is coated in order to form a membrane which differs from the bulk of the extruded body. This membrane may be formed from polymers, ceramics, glasses, and metals with special porosity or chemical activity. Often these membranes are formed from particulate containing slips. An additional difficulty with the standard multi-channel geometries is that they are difficult to coat with particulate containing slips since coating involves the flow of liquid through the ceramic body. Resistance to flow of the liquid from the slip can be detrimental to coating uniformity and adhesion.

Various filtration, and separation devices are described in U.S. Pat. Nos. 5,108,601, 4781,831, 5,009,781, and 4,222,874. Generally these devices suffer the disadvantages of either inefficient flow through and removal of the filtrate, or relatively complex fabrication.

For example, U.S. Pat. Nos. 5,108,601, 4,781,831, and 5,009,781 to Goldsmith relate to cross-flow filtration devices formed of porous material, for separating a feed stock into filtrate and retentate. These devices define a number of passageways extending longitudinally from the feed end face to a retentate end face of the structure, and which can serve as membrane supports. In general, these devices have a number of filtrate chambers distributed among the passageways for removal of the filtrate to ensure a favorable pressure drop from any passageway wall to a nearby chamber. The design and fabrication of these devices have some limitations. For example, Goldsmith shows several rows of passageways to one filtrate chamber. This arrangement results in significant back pressure during a filtration operation, the flow decreasing as the material passes through the device. This variation in flow is not acceptable. To compensate for this back pressure, the porosity and pore size of these devices is relatively large. However, larger pores are not desirable when membranes are applied or when the separation properties of the device are dependent on pore size. It would be advantageous to vary the pore size and porosity of the device without sacrificing filtration or separation efficiency (i.e. the ratio of the amount of filtered material to the amount of material passing through the device without being filtered or separated). Goldsmith does not make use of all of the surface area because of the flow limitations of his devices. Another difficulty with the Goldsmith devices is in the complexity of fabrication.

Connelly, in U.S. Pat. No. 4,222,874, discloses a relatively small tube for internal passage of the permeates. Connelly discloses multiple permeate ducts (i.e. conduits) but these only communicate through the end faces of the device. Connelly provides only a few, widely spaced conduits.

SUMMARY OF THE INVENTION

In accordance with one aspect of the invention, there is provided a device for altering a feed stock, which is made of a structure for passage of a feed stock. The structure can be either an extruded unibody structure, or a nested structure. The structure has an interior and an exterior section, and a longitudinal axis, and walls defining two sets of open-ended passages which extend along the longitudinal axis. The two sets of passages have different cross sectional shapes or dimensions with respect to each other. When the structure is nested, at least one set of channels have a cross section in the shape of truncated arcs.

In accordance with another aspect of the invention, there is provided a method for making the unibody structure which involves extruding a plasticized raw material mixture through a die, followed by heat-treating.

In accordance with another aspect of the invention, there is provided a method of altering a feed stock which involves passing a feed stock into the device through one set of passages to cause an altering of the feed stock, and thereafter passing the output stream into and through the other set of channels to the exterior of the device.

DETAILED DESCRIPTION OF THE INVENTION

Figure 1:
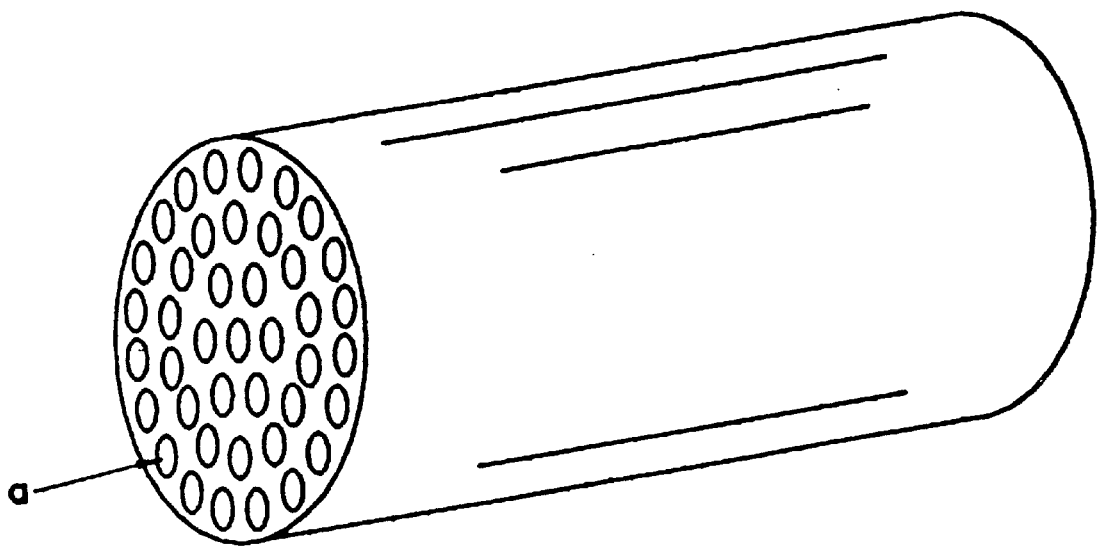
FIG. 1 is a schematic diagram of a prior art multi-channel extruded structure.
Figure 1A:
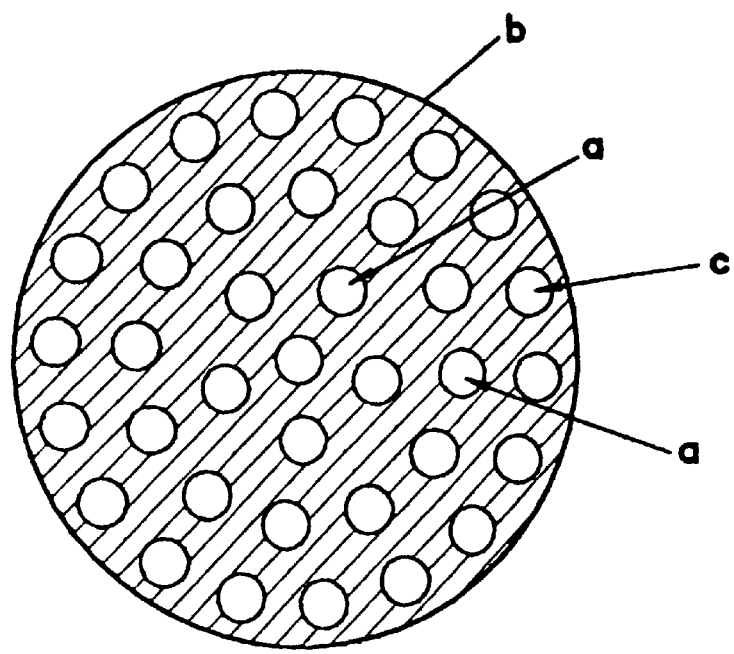
FIG. 1a is a schematic diagram of a cross section of the structure of FIG. 1.

The present invention provides a fluid-altering device which provides lower back pressure and higher flux per unit area than devices which are currently in use. The device can be an extruded unibody or monolithic core structure, or it can be a nested structure.

The structures are made up of interior and exterior sections, and a longitudinal axis. The exterior section includes the outer surfaces and faces, while the interior section includes the portion inside the exterior section. Walls within the structure define a plurality of open-ended passages which are essentially parallel to the longitudinal axis, or in other words, they extend parallel to the direction of extrusion. There are two sets of passages, which are distinguishable from one another by different dimensions and/or cross sectional shapes or cross sectional areas. All the passageways of a given set function essentially equally. In a preferred embodiment, each passage of one set lies adjacent to at least one passage of the other set, or to the exterior of the structure. This arrangement of passages affords the advantage of lower back pressure build-up in the device during a filtration, separation or other operation.

In applications such as filtration, or separation, one set of passages is referred to as primary channels, and the other set is referred to as egress conduits. For the most part, throughout this description, the two sets of passages will be referred to as such. The cross-sectional area of the egress conduits can be greater or less than that of the primary channels. As a general rule, the egress conduits have a greater cross sectional aspect ratio than the primary channels.

By a unibody structure, is meant that the structures are extruded in one piece. The advantage of producing a one piece or unibody structure in which both sets of passages are already formed, is that the structures are easier to make, and are less labor intensive. For example, less processing steps are required after extrusion for connecting the conduits with collection zones. Additionally the as-extruded structures generally have as much as, or more strength than structures which are fabricated from separate pre-formed component parts.

By a nested structure is meant that the structure is composed of cylindrical components, individually extruded, or otherwise made, and varying in cross sectional size, so that they fit one within another. The nested structures of this invention have some of their passages in the shape of truncated circular arcs, which are usually concentric. These truncated arcs usually, but not necessarily, serve as the egress conduits.

Generally, the device includes besides the extruded structure, other features, or alterations.

For example, in a preferred embodiment, the device has means for manifolding together the egress conduits. This can be done, for example, by having the structure define one or more openings intersecting the egress conduits and connecting the intersected egress conduits with the outside of the structure to provide communication between the individual egress conduits, and between the egress conduits and the outside of the structure. Such manifolding can be done by drilling holes in the proper places.

In another preferred embodiment, the device has means for isolating the egress conduits from the feed stock. This can be done, for example, by plugging the egress conduits at their ends to prevent the incursion of fluid other than the outlet stream, e.g. filtrate. If plugging the ends of the egress conduits is desired, then glass, polymers including silicones, e.g. silicone rubber, gaskets of various materials, tapes, waxes, metals, and ceramics can be used.

In another preferred embodiment, sealing means can be used to seal at least a portion of the exterior surfaces of the structure. The sealing means serves to prevent material from entering or exiting the structure through those surfaces. The sealing materials can be the same non-porous materials that are used as plugging materials.

Figure 26:
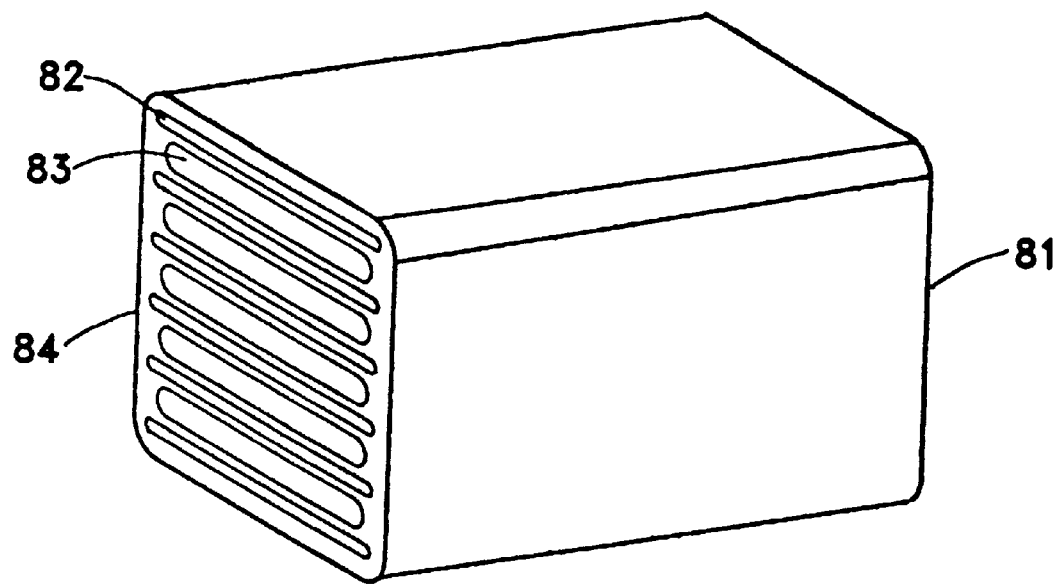
FIG. 26 is a schematic diagram of a device having slot-like primary channels and egress conduits.
Figure 26A:
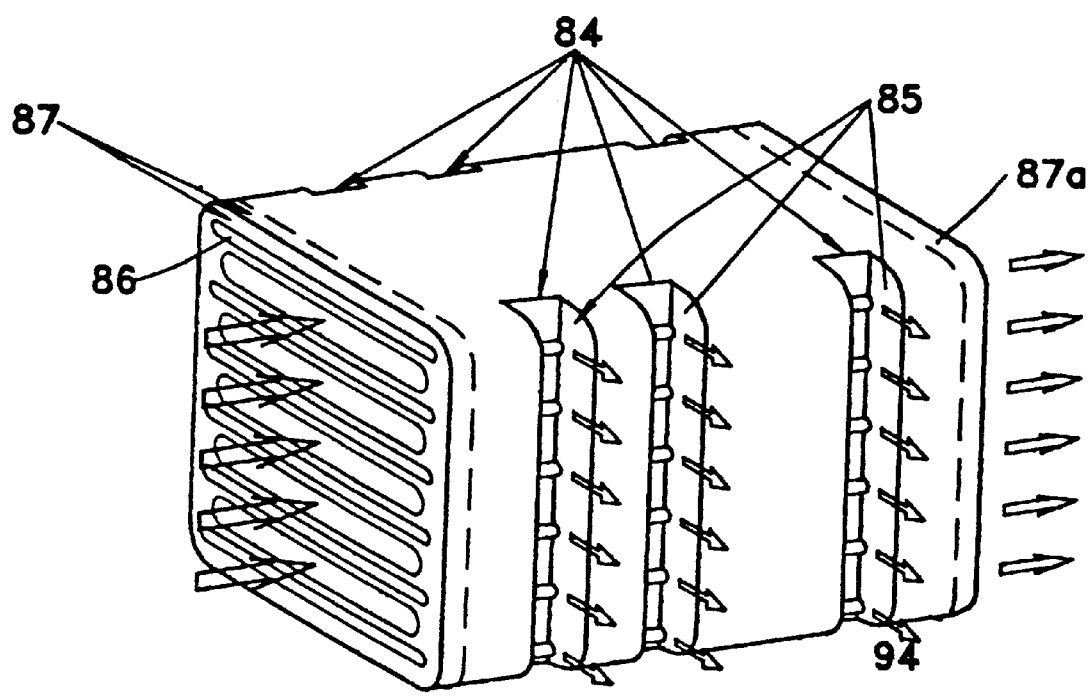
FIG. 26a is a schematic diagram of a device similar to that of FIG. 26 but having notched sides through which the egress conduits communicate with the outside.

Some devices employ both plugging and sealing as is shown particularly, for example, in FIG. 26a.

The porosity and pore size of the device can vary depending on the application and the invention is not limited to any porosity or pore size. If the device is to be used as a filter or a substrate for a highly porous membrane, then it is preferred that the average pore size be about 2 to 100 micrometers in diameter. The devices of the present invention can be of finer pore sizes than would otherwise be useful for multichannel filters, and thus average pore sizes of about 0.01 to 2 micrometers in diameter can also be useful. As with pore sizes, volume porosity can be varied depending on the application. It is preferred that the volume porosity range from about 15% to about 90%. Porosities less than about 15% are usually not preferred, and porosities greater than about 90% are difficult to achieve, although they would be useful.

The devices can be used in any application in which fluids are processed, i.e. which require passage of a fluid therethrough, such as in receiving and altering a feed stock or stream and discharging the resulting altered stream, e.g. filtration, microfiltration, ultrafiltration, reverse osmosis, gas separations, or pervaporation, applications involving reactions such as oxidation, reduction, isomerization, etc. Some uses are for filtering of beer to remove active yeast, and other microbe filtering applications, the filtering of water to remove particulate matter, for separation of gas mixtures, such as separating hydrogen gas and hydrocarbons. Other uses include gas separations where a membrane is employed. Such applications can include separations using zeolite membranes. Examples include separation of isomers such as ortho, para, and meta xylenes using zeolite membranes, separation of oxygen and nitrogen from air using mixed ionic conductors such as $LaO.2SrO.8FeO.6CoO.40x$, and the separation of $CO2$ from $CH_4$ using carbon membranes.

The devices of the present invention are especially suited as filters for separating a feed stock into a filtrate or permeate, and retentate. The mixed gas feed stock enters the device at one end and separation occurs as the gas passes along the primary channels. Membranes are more permeable to one or more of the gases in the feed stock and less permeable to others. The permeable gases pass through the membrane and travel through the device to the egress conduits or out of the exterior surface. The permeate gases within the conduits then pass out of the device through holes or slits drilled in the sides of the device. The egress conduits provide open, low back pressure paths for the permeate. It is preferred that the egress conduits be provided such that the permeate need only travel from the primary channel to an adjacent egress conduit in order to exit the device. Placing each primary channel adjacent to at least one egress conduit or to the exterior of the device has the effect of lowering the back pressure and increasing the flux per unit area.

An especially preferred embodiment is to have each primary channel adjacent to either two egress conduits or adjacent to one egress conduit and the exterior of the structure.

In order to make the most use of the available surface area in the structure, it is preferred that the number of egress conduits be much less than the number of primary channels while the egress conduits are kept adjacent to the primary channels. The devices of the present invention allow for use of essentially all of the available surface area, e.g. membrane surface area when a membrane is employed.

One useful arrangement is to have at least three primary channels adjacent to each egress conduit so as to limit the number of egress conduits and reduce the difficulty in manifolding.

It is preferred that the egress conduits have a cross section with an aspect ratio of greater than about three. Cross sectional aspect ratio is the ratio of the cross sectional length/cross sectional width of the conduit opening.

It is also desirable that the distance between the passages of one set exceeds the distance between those passages and an adjacent passage of the other set. For example the distance between primary channels is greater than the distance between primary channels and egress conduits. This arrangement is preferred because it allows more uniform flow especially in coating applications, where flow of the coating material through to the passages being coated is improved.

Because the geometry of the device of the present invention allows for lower back pressure, the device is not limited to a specific porosity or pore size. Therefore the device is better suited than other currently used devices to accept and hold a membrane.

The primary channels can have a coating, or a membrane that can be in the form of a coating, to effect various separations, and the invention is not limited to any particular coating, membrane or separation scheme. The membrane or coating differs from the bulk of the extruded body. This membrane can be formed from polymers, ceramics, glasses, e.g. silica, alumina, titania, and mullite, carbon, and metals with special porosity or chemical activity. Often these membranes are formed from particulate containing slips. One useful coating is a carbon coating described in U.S. Pat. NO. 5,451,444, filed Jan. 29, 1993 which is herein incorporated by reference as filed. That patent relates to forming a continuous uninterrupted carbon coating on a substrate, by contacting the substrate with a carbon precursor, e.g. a resin, which is subsequently carbonized and activated. As discussed previously, an additional difficulty with the standard multi-channel geometries is that they are difficult to coat with particulate containing slips since coating involves the flow of liquid through the ceramic body. Resistance to flow of the liquid from the slip can be detrimental to coating uniformity and adhesion. The low back pressure and high flux advantages of the device of the present invention can provide the additional advantage of a uniform coating.

The egress conduits can be coated in order to provide the desired functionality, e.g. filtration, gas separation, or catalytic or adsorptive activity. The egress conduits can also be equipped with means of providing a second gas or liquid. This second gas or liquid can be a sweep gas or a reactive gas or gas mixture.

The structure can be made of ceramic, glass-ceramic, glass, plastic, wax, molecular sieve, carbon, metal, polymers, ion exchange resins, and combinations of these materials.

Any powders included under the above class or which when heat-treated or fired yield materials in the above described class can be used. By combinations is meant physical or chemical combinations, eg., mixtures or composites.

Some ceramic powder materials which can be useful are cordierite, mullite, clay, talc, zircon, zirconia, spinel, aluminas and their precursors, mullite-bonded alumina, silicas and their precursors, silicates, aluminates, lithium aluminosilicates, alumina silica, feldspar, titania, fused silica, nitrides, carbides, borides, eg., silicon carbide, silicon nitride or mixtures of these. The preferred materials are mullite, mullite-bonded alumina, alumina, titania, and combinations of these.

In general, the powder material is fine powder (in contrast to coarse grained materials) some components of which can either impart plasticity, such as clays, when mixed with a vehicle such as water, or which when combined with organic materials such as for example the organic binder can contribute to plasticity.

Some types of molecular sieves that can also be used are carbon molecular sieves, zeolites which are especially suited and are preferred, aluminophosphates, metallophosphates, silicoaluminophosphates, and combinations of these. Some preferred zeolites are faujasite type, e.g. Y zeolite, pentasil e.g. ZSM type such as ZSM-5, mordenite, and beta, and combinations of these.

The invention is suitable for use with metal powders. Any sinterable metal or metal composition can be used in the practice of the present invention. Especially suited are iron group metal, chromium, and aluminum compositions, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders are disclosed in U.S. Pat. Nos. 4,992,233, 4,758,272, and 5,427,601, which are herein incorporated by reference as filed.

Plasticized mixtures of the above powders are extruded through a die into the unibody structure and then dried. The extrusion dies for a specific filter configuration can be made by those skilled in the art.

The dried structure is then heated or fired to form the final product structure. The firing conditions of temperature and time depend on the composition and size and geometry of the structure, and the invention is not limited to specific firing temperatures and times. For example, mixtures that are primarily for forming mullite, the temperatures are from about 1400° C. to about 1600° C., and the firing times are from about 1 hour to about 6 hours. Firing times depend on factors such as kinds and amounts of materials and nature of equipment but typical total firing times are from about 20 hours to about 80 hours. For metal bodies, the temperatures are about 1000° C. to 1400° C. in a reducing atmosphere preferably hydrogen. Firing times depend on factors as discussed above but are typically at least 2 hours and typically about 4 hours. For zeolite bodies, the temperatures are about 400° C. to 1000° C. in air. Firing times depend on factors as discussed above but are typically about 4 hours.

By carbon powders is generally meant activated carbon. Any available activated carbon can be used.

Carbon devices can be fabricated from carbon particles or from carbon precursors such as resins, that are carbonized and then activated to form activated carbon.

The activated carbon shaped device can be made by extruding mixtures of activated carbon particles according to methods which are well known in the art. For example, the activated carbon particles can be combined with suitable binders such as various clays such as disclosed in U.S. Pat. No. 4,518,704 Another method is to extrude a kneaded mass containing a thermosetting resin, a water-soluble thermosetting resinous additive as a binder, and an extrusion aid, followed by drying and heat-treating, as disclosed in U.S. Pat. No. 4,399,052. Both of these patents are herein incorporated by reference.

The activated carbon shaped device can be made from a carbon precursor such as a thermosetting resin, e.g. phenolic resin. This can be done by forming a mixture of the resin and binders, extruding into the shaped structure, followed by carbonizing and activating according to well-known procedures.

The activated carbon shaped structure can be made by extruding a mixture of thermosetting resin which is either solid such as phenolic novolak or liquid such as phenolic resole, having a high viscosity e.g. 100–1000 cps, fillers, temporary organic binder, e.g. methylcellulose and/or its derivatives, and optionally extrusion aids e.g. sodium stearate, drying the shaped form and curing the resin, and carbonizing and activating the carbon to form the structure. These embodiments are disclosed in U.S. application Ser. No. 08/395,224, filed Feb. 27, 1995, abandoned which is herein incorporated by reference.

The overall shape of the structures can be cylindrical, hexagonal, oval, including elliptical in cross section including flattened ellipses, rectangular, etc. The passages can have cross sections which are cylindrical, hexagonal, triangular, square, rectangular, slot-like, or otherwise shaped which are formed during the extrusion process and reflect the geometry of the extrusion die. The passages can be arranged in concentric rings, repeating rows, hexagonal arrays, or similarly arranged geometric patterns, or combinations of these. Shapes and dimensions can be varied to suit the needs of the particular application. For example, if a membrane or coating is applied to the channels, the channels must be of sufficient dimension to allow the membrane or coating to be applied, and to permit the membrane or coating to adhere to the channel walls and be durable. The egress conduits must be of sufficient dimension to allow efficient removal of the component which passes through the membrane or coating. Both channel and conduits must be of a configuration which can be extruded.

Reference is made to the accompanying drawings which show the most useful configurations of the device of the present invention.

In a preferred embodiment of the unibody extruded structure, the primary channels are arranged in concentric rings. The egress conduits are arcs which are concentric with, and lie between, the rings of primary channels, so that each ring of cylindrical primary channels lies adjacent to an egress conduit arc or adjacent to the exterior of the body. The arc length of the cross-section of the conduit arcs is greater than the diameter of the cylindrical primary channels. To keep the number of egress conduits less than the number of primary channels while placing the egress conduits adjacent to the primary channels, the cross-sectional dimension of the egress conduit is desirably, but not necessarily maintained such that it spans three or more primary channels in adjacent rings. It is also preferred to have the cross sectional aspect ratio of the egress conduits be greater than about 3 to 1 so that they are narrow and long. In this way, the number of egress conduits is small compared to the number of primary channels. The volume taken up by the egress conduits would be small resulting in easier fabrication. As means for manifolding the egress conduits, holes are drilled from the exterior of the body, in a direction normal to the surface of the body, and perpendicular to the plane or arc of the egress conduit, so that the holes intersect all of the egress conduits. Surface area of such devices can be equal to or greater than about 100 ft$^2$ (channel area for membrane)/ft$^3$ of structure.

Figure 2:
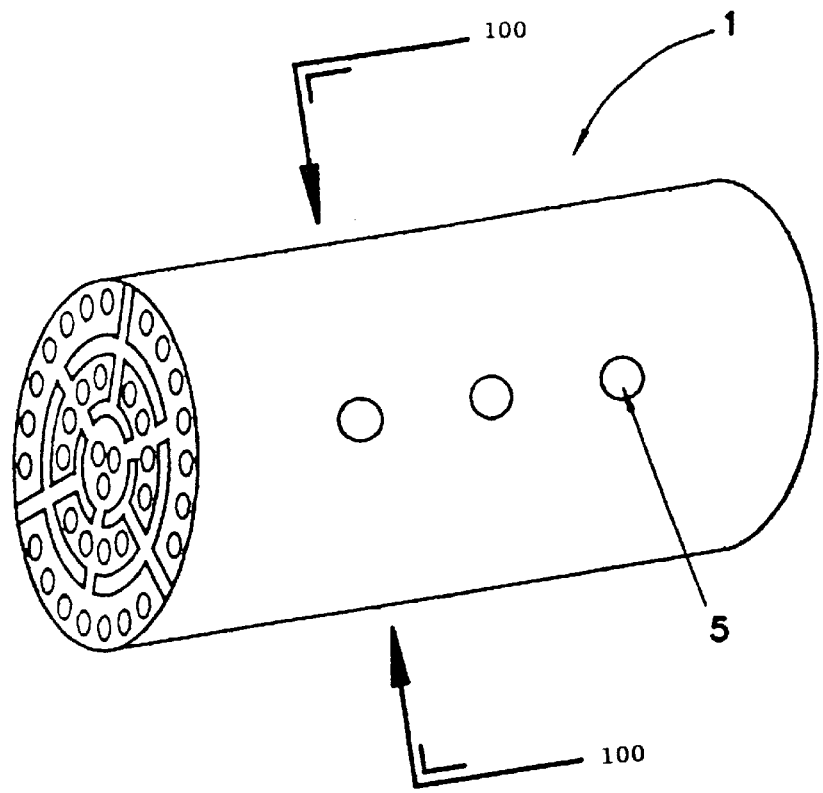
FIG. 2 is a schematic diagram of an extruded structure of the present invention, having egress conduits and holes for manifolding.
Figure 2A:
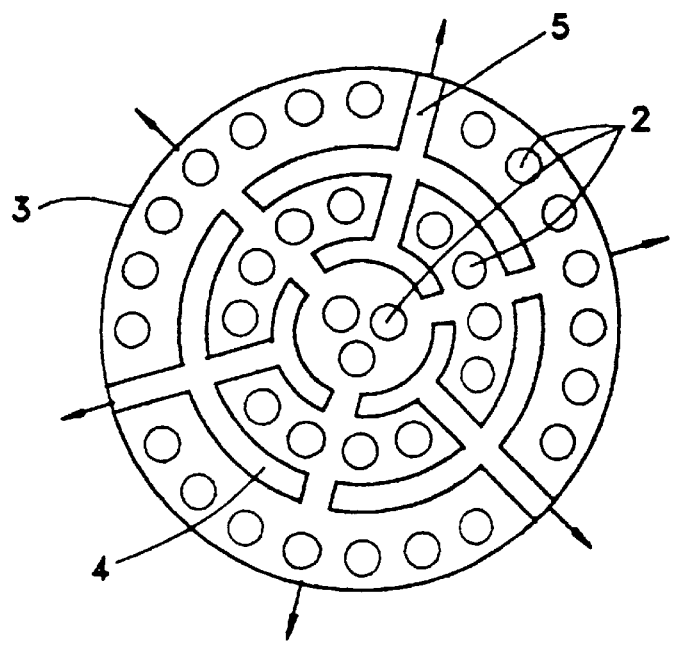
FIG. 2a is a schematic diagram of a cross section of the structure of FIG. 2.

This embodiment is illustrated in FIGS. 2 which is a view of the device, 1, and 2a which is a cross section of the device of FIG. 2 through section 100. In FIG. 2a, all of the primary channels 2, are shown adjacent to the exterior surface of the device, 3, or to the egress conduits 4. The egress conduits are formed by forming longitudinal pillars during extrusion. The means for manifolding are provided by holes, 5, drilled normal to the surface of the monolith. These holes penetrate into the interior of the monolith so that all of the egress conduits communicate with the exterior. Flow of the filtrate occurs both through the egress conduits via the drilled holes, and through the exterior surface of the extruded body. This is shown by the arrows in FIG. 2a.

Figure 3:
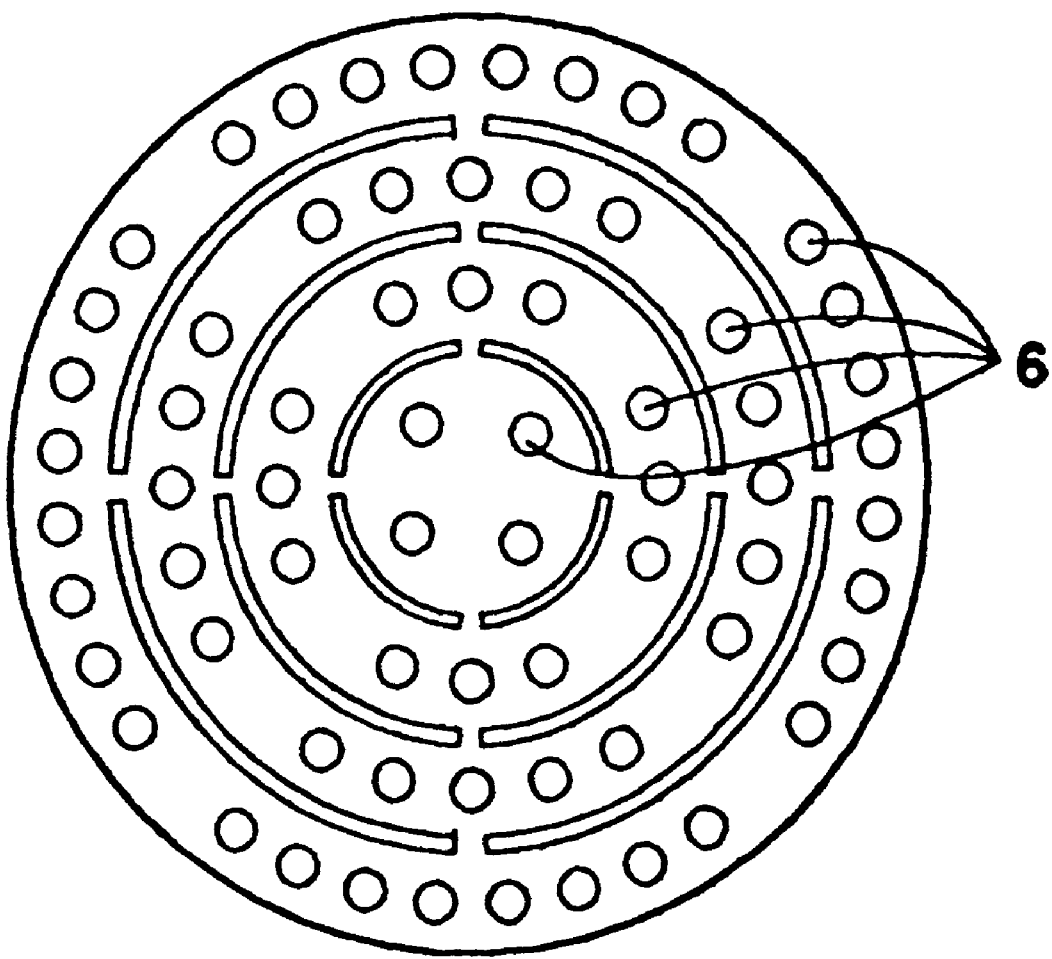
FIG. 3 is a schematic diagram of a cross section of a device similar to that of FIG. 2 but with a larger number of primary channels.

FIG. 3 is a cross section of a device similar to that of FIG. 2 but with a larger number of primary channels, 6.

Figure 4:
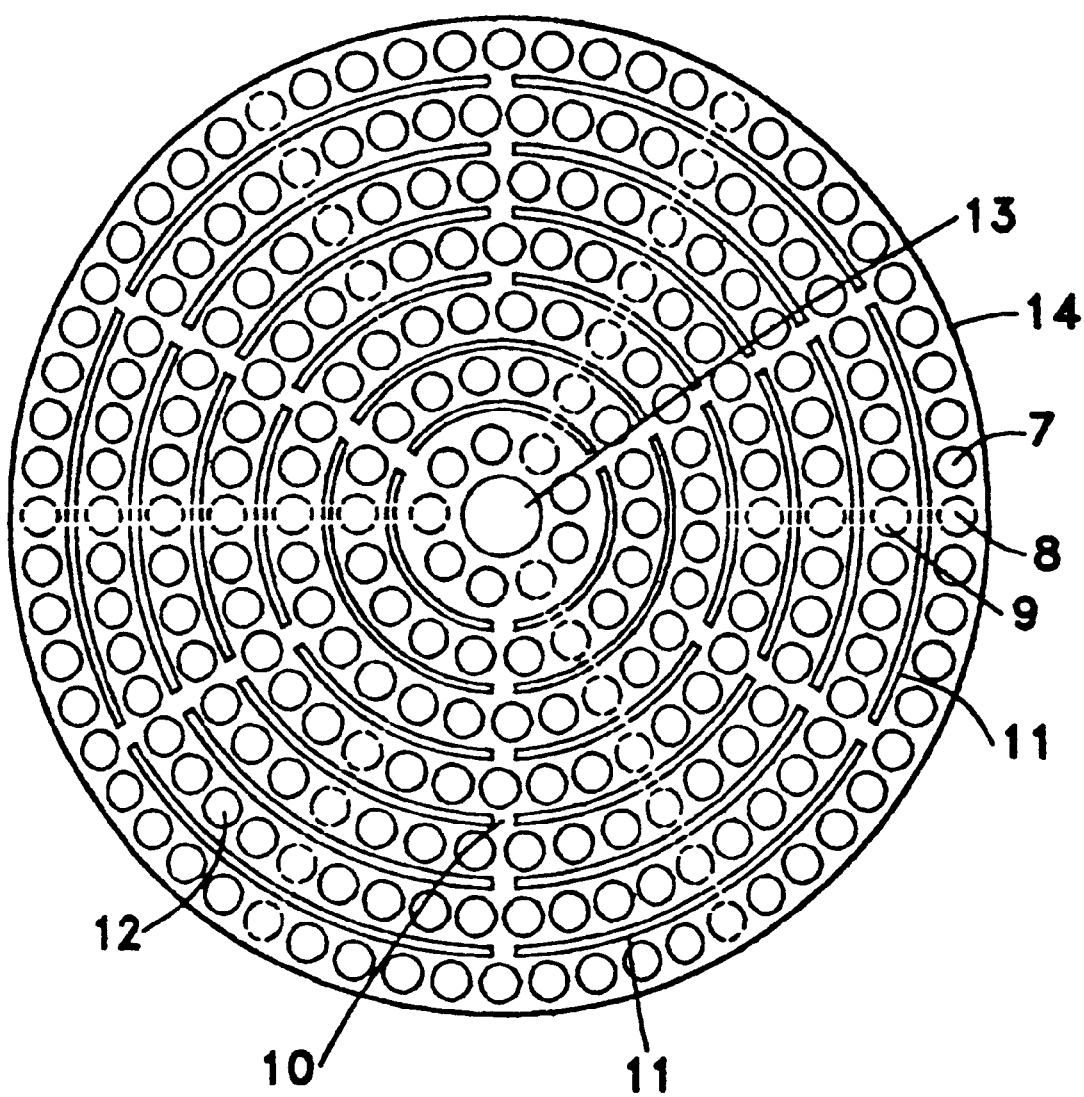
FIGS. 4, 5, and 6 are schematic diagrams of cross sections of devices similar to FIG. 3 but having various numbers of primary channels and egress conduits.

FIG. 4 is a schematic diagram of a cross section of a device having 247 cylindrical openings arranged in 7 rings. Two hundred sixteen of these are passageways, 7, are for fluid. Thirty-one are dummy channels, 8, which are provided as convenient sites for the communication channels, 9, which are drilled periodically along the length of the device. According to this invention by dummy channels is meant those channels which are extruded in the unibody but which do not serve as primary channels and act only as space holders or as means to improve the uniformity of extrusion. The device contains pillars, 10, such that all of the truncated arc conduits, 11, are held open. It is preferred that at least some of the dummy channels be aligned radially. It is most preferred that all the dummy channels be aligned radially. Radial alignment is advantageous because it allows easier drilling through the communication channels. In FIG. 4, the dummy channels and pillars are rotated with respect to each other so that they do not overlap. However, they can in fact coincide. The device of FIG. 4 has passageway walls, 12, which are uniform throughout. The device also contains a central conduit, 13. For strength, it can be advantageous to have the outermost passageway walls or skin, 14, be thicker than the interior passageway walls, 12. This will slightly reduce the uniformity of flow through the device.

Figure 5:
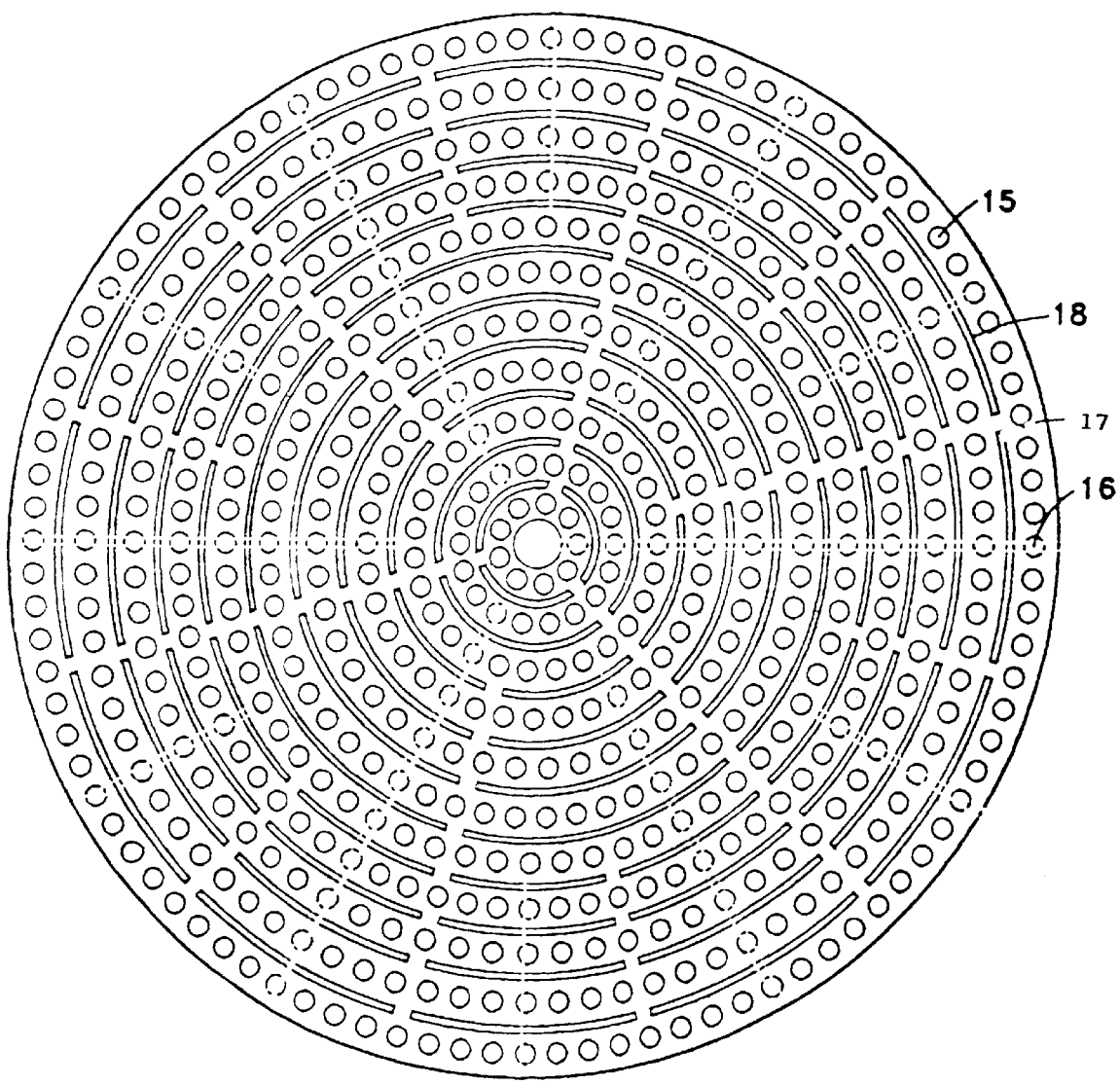

FIG. 5 is a schematic diagram of a cross section of a larger device than that of FIG. 4. FIG. 5 shows 492 primary channels, 15, arranged in 11 rings, 17, and 79 dummy channels, 16, and truncated arc egress conduits, 18. If made as a 7.6 cm (3") diameter structure with about 1.5 mm diameter channels, 0.635 mm (25 mil) wide conduits, and 0.584 mm (23 mil) thick walls, this device would contain about 498 $m^2$ of passageway per $m^3$ of monolith structure (151.9 $ft^2$ per $ft^3$ of monolith).

Figure 6:
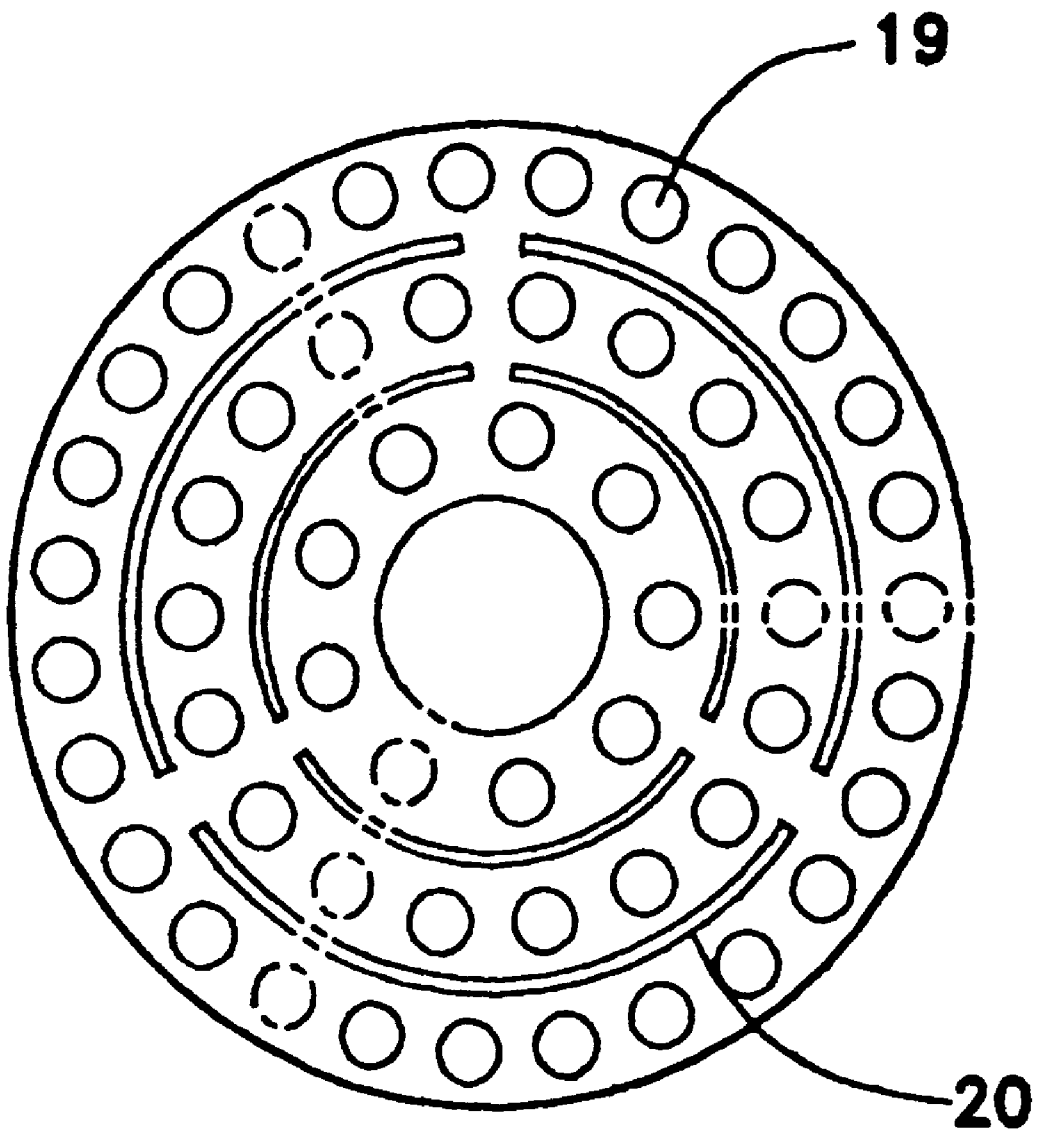

FIG. 6 is a schematic diagram of still another device with circular primary channels, 19 arranged in 3 rings, and truncated arc egress conduits, 20.

Figure 7:
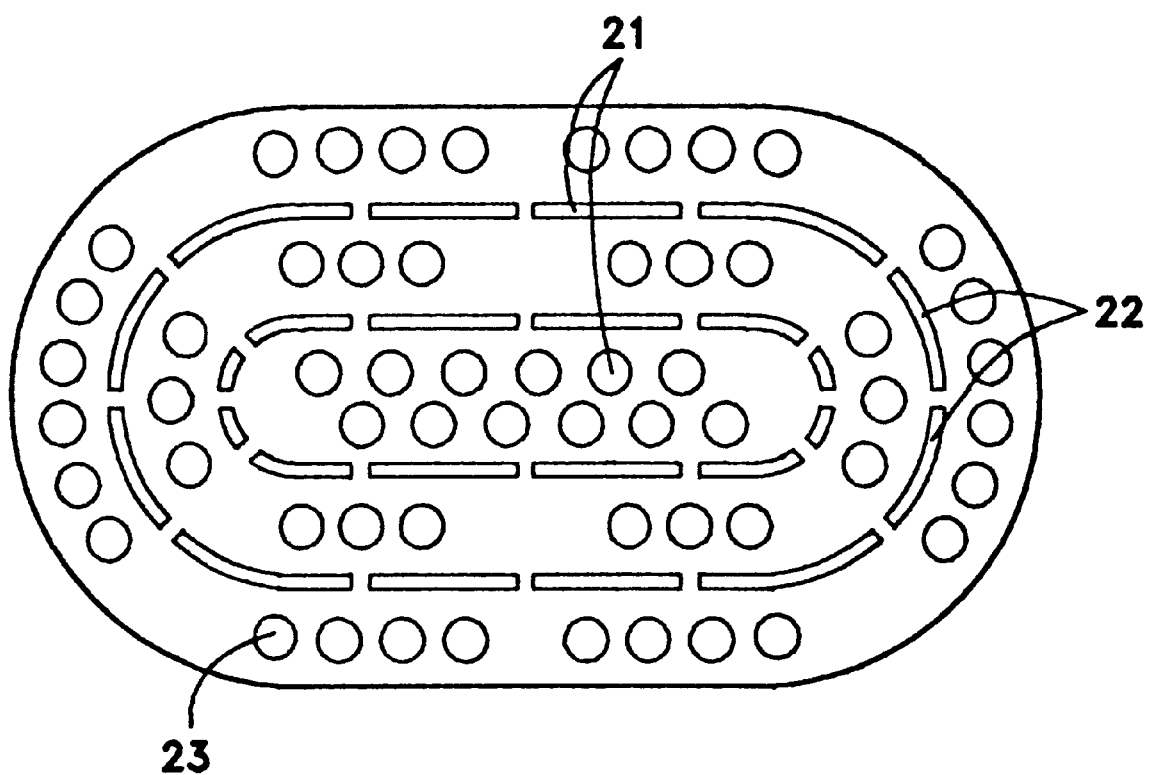
FIG. 7 is a schematic diagram of a cross section of a device which is in the shape of a flattened ellipse, and having circular primary channels and rectangular and truncated arc egress conduits.

FIG. 7 is a cross section of a device which has an overall oval configuration, which is a flattened ellipse or racetrack configuration in cross section, with essentially rectangular egress conduits 21, and truncated arc egress conduits, 22. Primary channels are shown as 23.

In another embodiment, the monolithic structure can have multiple circular primary channels parallel to the long axis of the extrudate and arranged around egress conduits having cross sectional geometries other than arcs. One dimension of the conduit cross section is greater than the diameter of the cylindrical primary channels. Examples of possible egress conduit cross section geometries include triangular, square, hexagonal, rectangular, oval, and combinations of these. Holes are drilled from the exterior of the device, in a direction normal, or at some angle from normal, to the surface of the monolith. The drilled holes intersect all of the egress conduits and the exterior of the device.

Figure 8:
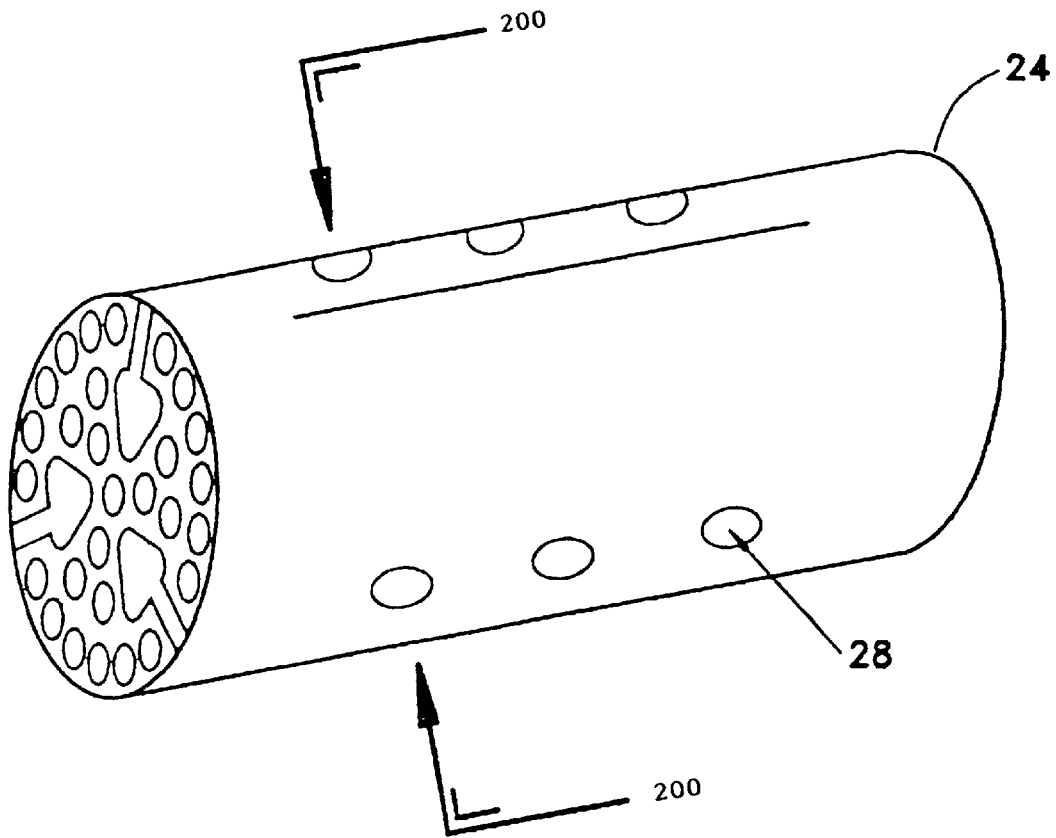
FIG. 8 is a schematic diagram of a device having roughly triangular egress conduits.
Figure 8A:
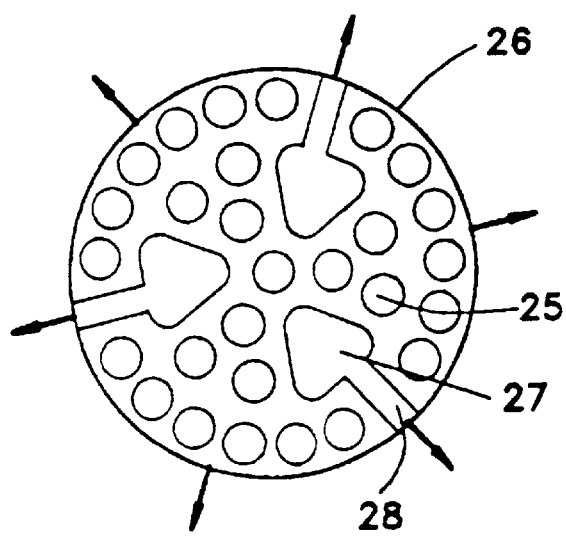
FIG. 8a is a schematic diagram of a cross section of the device of FIG. 8.

In FIG. 8 which is a full view of a device 24, and FIG. 8a which is a cross section of the device of FIG. 8 through section 200, the primary channels 25, are adjacent to the exterior of the device, 26, or to the egress conduits, 27, which have a roughly triangular cross section. Holes 28, are drilled to provide a means for manifolding. The arrows in FIG. 8a indicate the direction of flow of an outlet stream out of the device.

Figure 9:
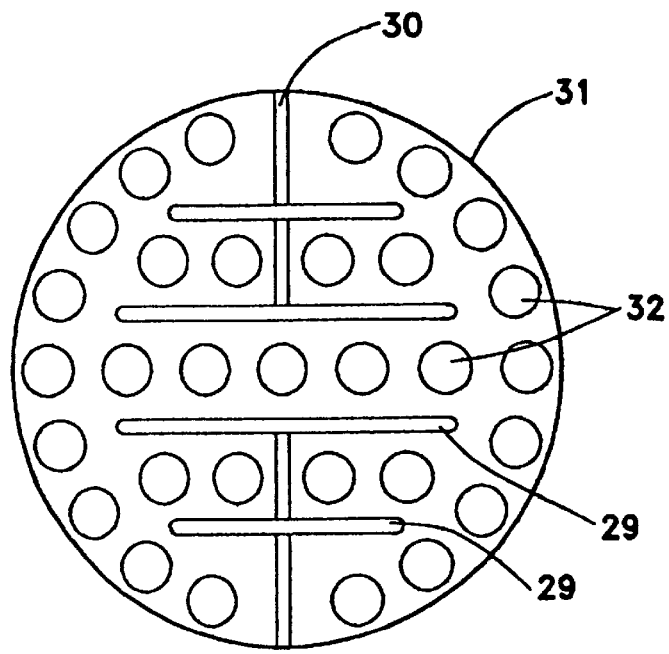
FIGS. 9 and 10 are schematic diagrams of a cross sections of devices having rectangular or slot-like egress conduits showing drilled holes for communication with the outside.

FIG. 9 is a cross section of a device in which the egress conduits, 29, are roughly rectangular or slot-like. Holes, 30, are drilled to allow for communication with the exterior of the device. In this embodiment, the primary channels 32, are arranged in a ring near the exterior surface, 31, and in rows between the rectangular egress conduits.

Figure 9A:
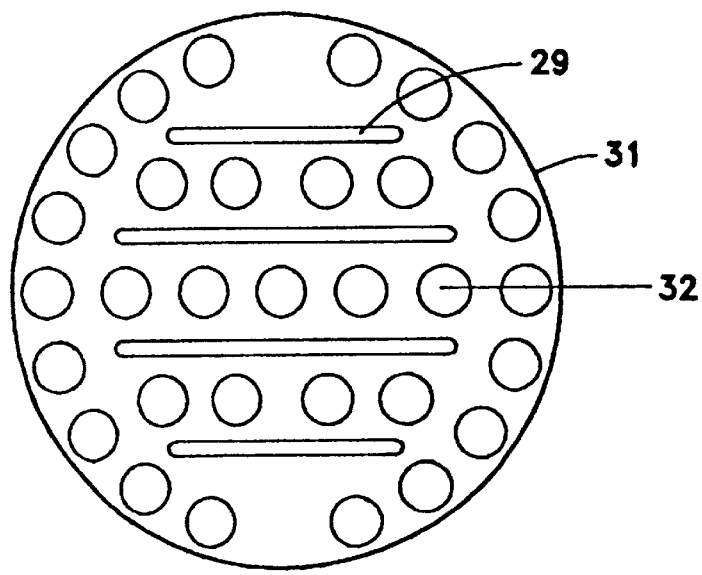
FIGS. 9a and 10a are cross section of the devices of FIGS. 9 and 10 respectively, taken between the drilled holes.

FIG. 9a is a cross section of the device of FIG. 9 taken between the drilled holes.

Figure 10:
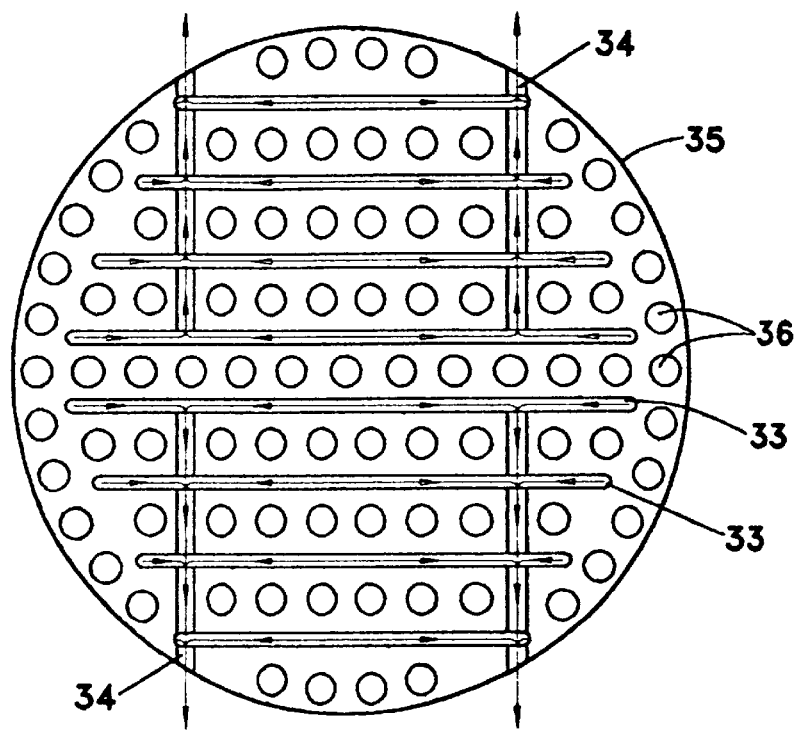

FIG. 10 demonstrates how the geometry shown in FIG. 9 can be extended to very large structures with large numbers of primary channels. FIG. 10 is a cross section of a device which contains a large number of egress conduits, 33, and four sets of holes, 34, drilled to provide communication to the outside through exterior surface, 35. The primary channels are shown as 36. The arrows indicate direction of flow out of the device.

Figure 10A:
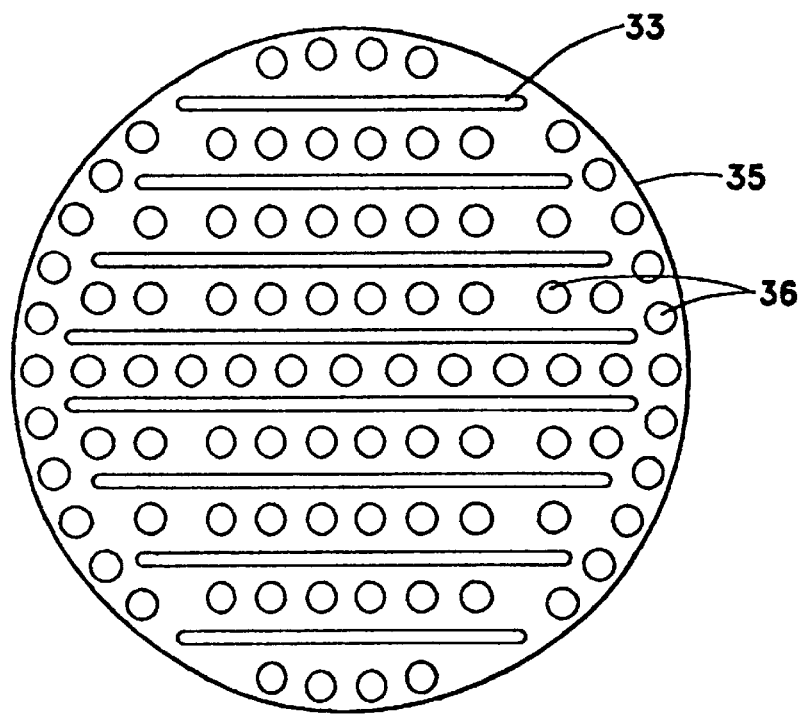

FIG. 10a is a cross section of the device of FIG. 10 taken between the drilled holes.

In still another embodiment, the structure is a porous extruded monolith having a multiplicity of cylindrical primary channels parallel to the long axis of the extrudate and arranged in concentric rings. The structure also has radial egress conduits which extend from near the exterior surface of the extruded body to points within the interior so that each primary channel lies adjacent to a radial conduit or adjacent to the exterior of the structure. One dimension of the conduit cross section is greater than the diameter of the cylindrical primary channels. As means for manifolding the egress conduits, holes can be drilled from the exterior of the structure, in a direction normal to the surface of the structure and perpendicular to the plane or arc of the egress conduit, so that the holes intersect all of the egress conduits. In this embodiment, the drilled holes are optional, since the radial conduits can closely approach the surface of the structure.

Figure 11:
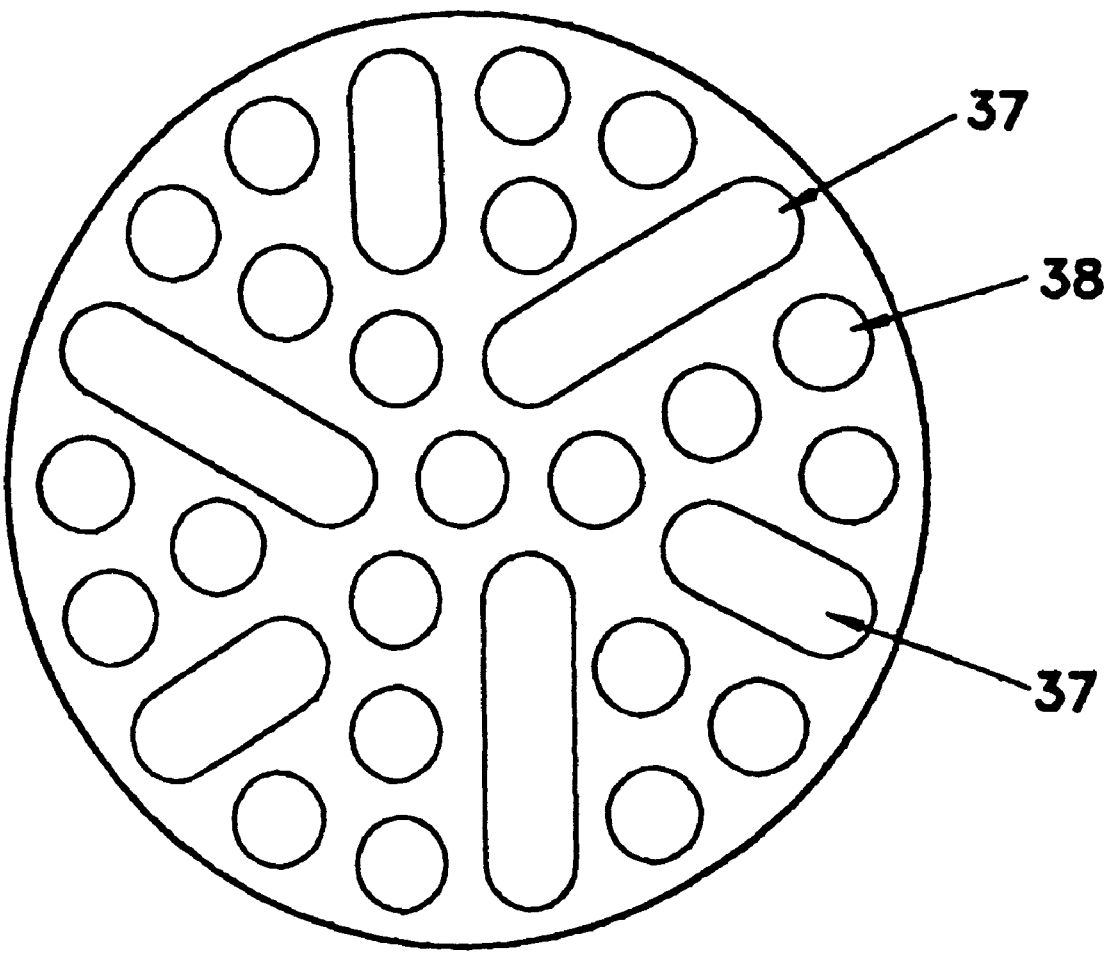
FIG. 11 is a schematic diagram of a cross section of a device having radial egress conduits.

One channel pattern for structures with radial conduits is illustrated in FIG. 11. In FIG. 11, egress conduits, 37, are provided such that every primary channel 38, lies adjacent to a radial conduit.

In another embodiment, the monolith structure can have multiple concentric rings, each ring having a multiple primary channels, usually cylindrical in shape, and parallel to the longitudinal axis of the structure. The inner rings can be held concentric with the outer rings by gaskets, props, bumps or ridges along their length. If ridges are employed, slots or grooves can be cut in the ridges as manifolding means for communication between adjacent regions of the egress conduits. This design allows for a maximum number of primary channels and minimizes the complexity of the extrusion die. These structures can be extruded as a unibody, or they can be made by nesting individually extruded rings.

Figure 12:
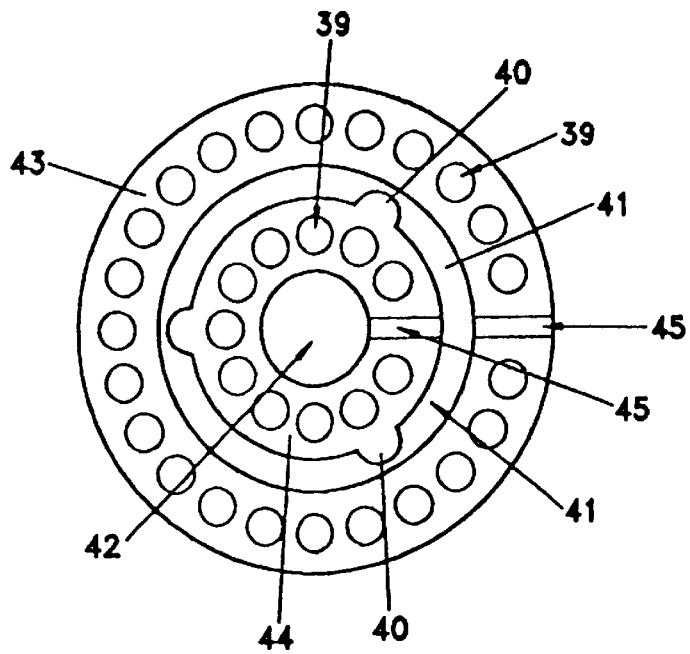
FIG. 12 is a schematic diagram of a cross section of an structure having a multiplicity of concentric rings.

FIG. 12 is a schematic diagram of a cross section of such a cylindrical shaped device. The primary channels, 39, are present in concentric rings. Means for spacing, 40, are an integral part of the inner rings and form egress conduit, 41. A center conduit is shown as 42. The outer ring is shown as 43, the inner ring as 44. The primary channels are all adjacent to the to the interior or exterior of each ring. Communication between the inside and outside such as between 42 and 41 is provided by holes, 45, drilled through each ring, which holes provide a means of manifolding.

Figure 15:
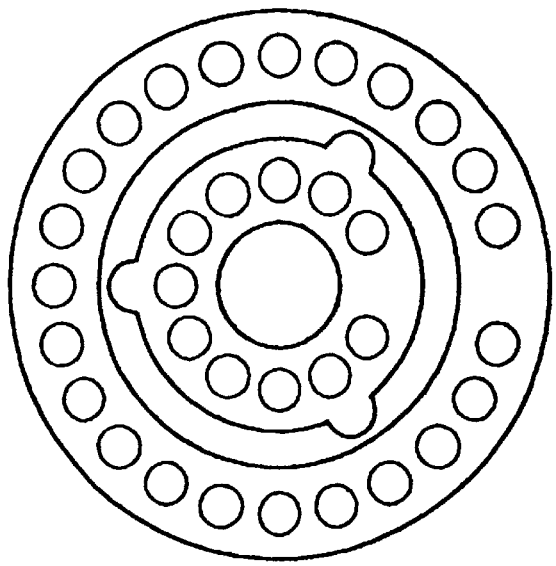
FIGS. 15a and 15b are schematic diagrams of cross sections of individual rings which can be nested to make the device of FIG. 15.
Figure 15A:
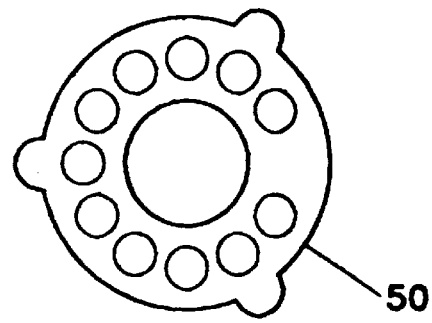
Figure 15B:
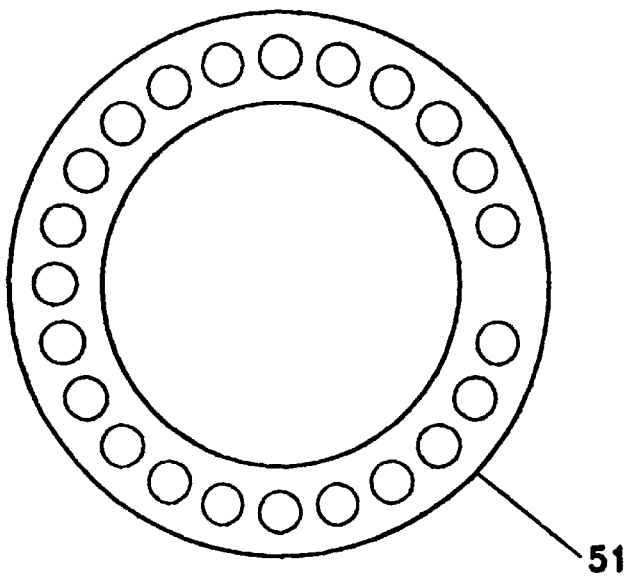

FIG. 15a shows a ring 50 which can be extruded separately from and nested into ring 51 of FIG. 15b to form a device having a cross section shown in FIG. 12.

Figure 13:
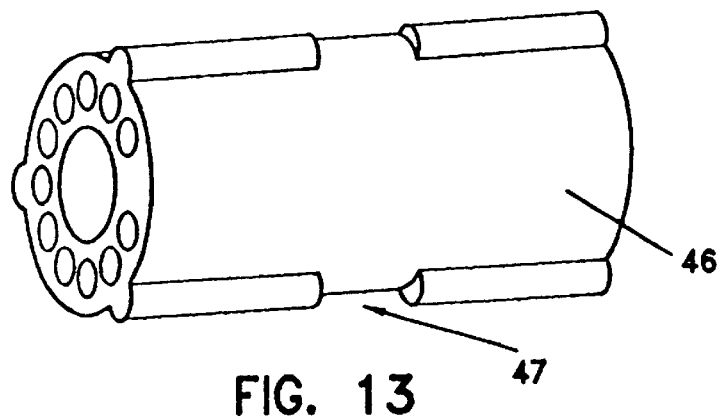
FIG. 13 is a schematic diagram of a ring similar to the inner ring of FIG. 12 but with slotted spacing means.

In order to minimize the number of holes in a device such as depicted in FIG. 12, slots can be cut in through the spacing means. This is shown in FIG. 13 in which a ring, 46, similar to the inner ring 44 of FIG. 12, has slots, 47.

Figure 14:
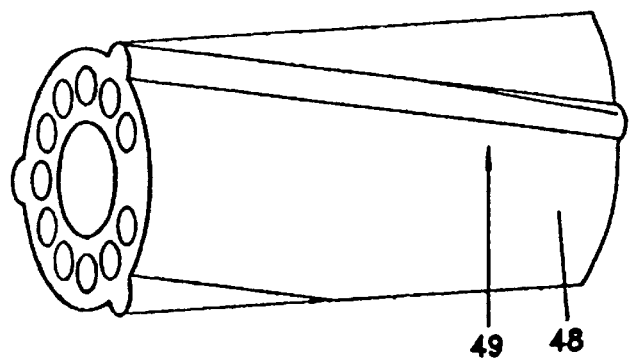
FIG. 14 is a schematic diagram of a ring similar to the inner ring of FIG. 12 but with helical spacing means.

The spacing can also be provided in a way as shown by FIG. 14, in which ring 48 has spacing means, 49, which is not co-linear with the structure but which wraps around the structure in a helical configuration.

Figure 16:
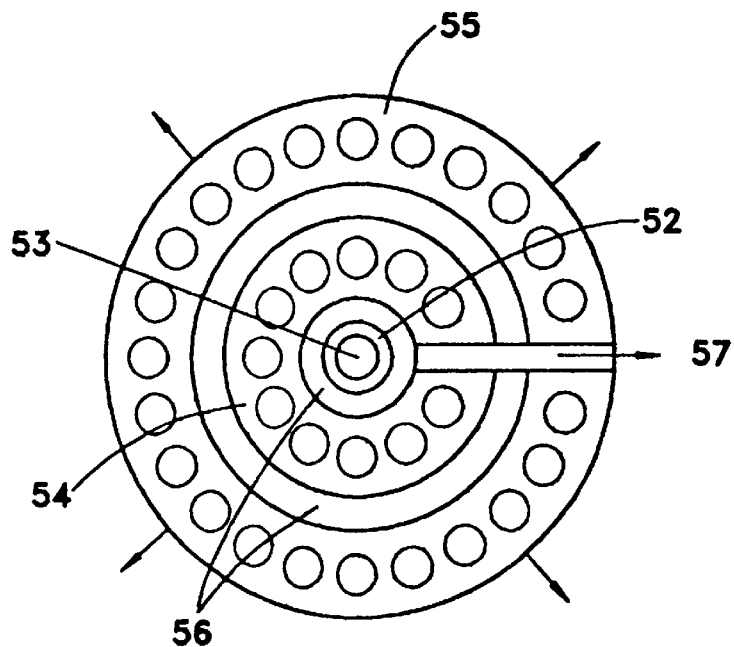
FIG. 16 is a schematic diagram of a device with nested rings.
Figure 16A:
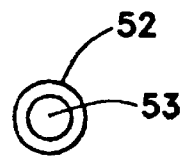
FIGS. 16a, 16b, and 16c are schematic diagrams of cross sections of the individual rings making up the device of FIG. 16.
Figure 16B:
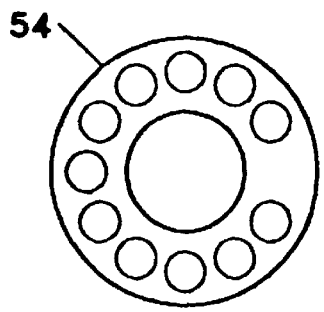
Figure 16C:
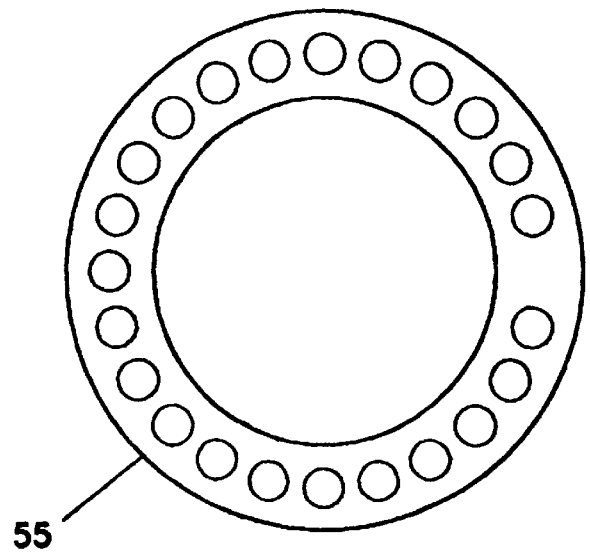

Another example of rings which are extruded separately and then manually nested is shown in FIG. 16. FIG. 16 illustrates the simplest expression of this embodiment. The structure of FIG. 16 is made of a multiplicity of concentric rings which are extruded separately and then nested together after heat-treatment. In FIG. 16, the inner ring, 52, also shown in FIG. 16a, consists of a tube, 53, which is nested in a middle ring, 54, also shown in FIG. 16b, which is in turn nested in an outer ring, 55, which is shown also in FIG. 16c. Spacers or gaskets, 56, can be inserted at the ends of the structure to maintain a constant spacing between the rings. Flow is through the most exterior ring surface or through the egress conduits which are formed by the spacers, and is facilitated by one or more holes, 57 drilled through each concentric ring which communicate between the inside and outside of the device. Flow out of the device is shown by the arrows.

The means of communication (drilled holes in FIG. 16) can be distributed uniformly along the length of the structure or they can be located near the ends such that, with additional external manifolding, a sweep gas may be employed which enters the structure at one end, passes down the length of the structure, and exits the means provided at the opposite extreme, carrying with it the outlet stream.

Figure 17:
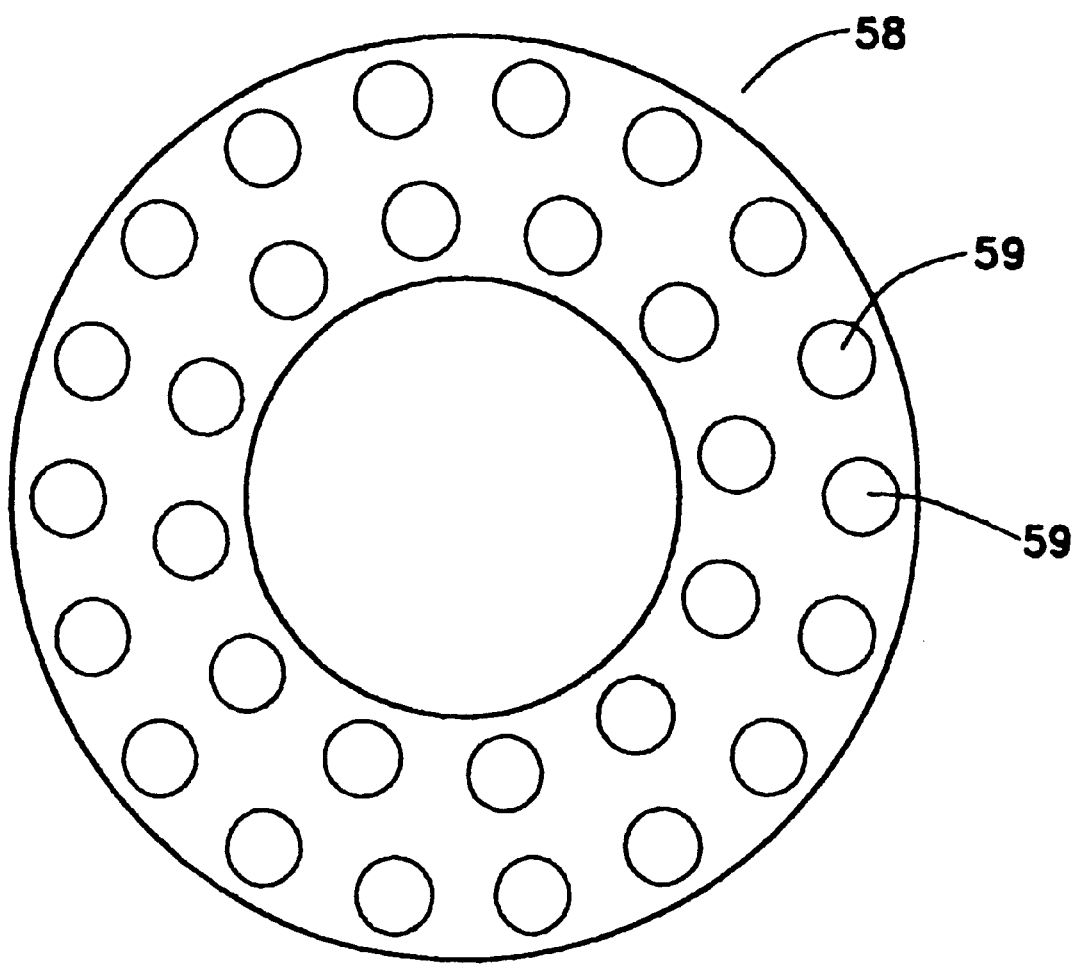
FIG. 17 is a schematic diagram of a cross section of a ring of primary channels which can be nested with other rings to form a device of the present invention.

FIG. 17 which illustrates a ring, 58, of primary channels, 59, arranged in two concentric rings can be manually nested with other rings to form a multi-tubular or nested device.

The concept of non co-linear spacers can be applied to the rings or pillars of the previous embodiments. These pillars can be moved during extrusion in such a way that all of the egress conduits are opened to the exterior.

Figure 18:
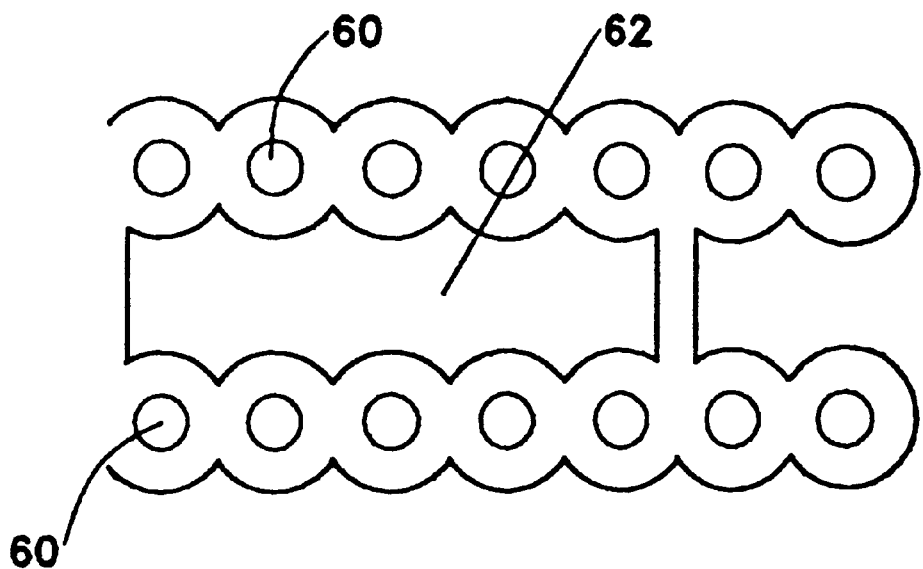
FIGS. 18 and 19 are schematic diagrams of portions of cross sections of devices showing various configurations of passages.
Figure 19:
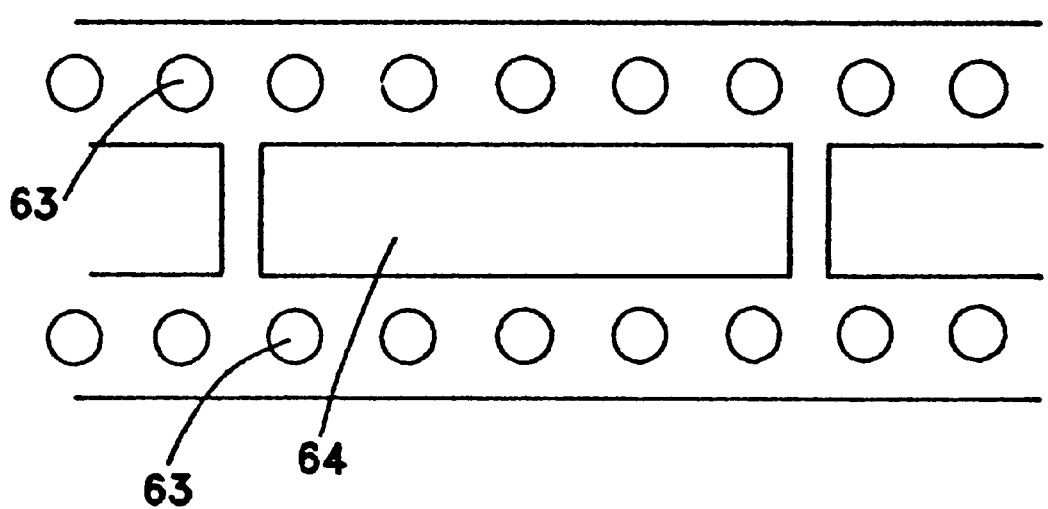

FIGS. 18 and 19 show portions of cross sections of devices showing various configurations of passages.

FIG. 18 shows round shaped primary channels, 60. The egress conduit, 62 is defined by a wall that has a ridged configuration.

FIG. 19 shows round primary channels, 63. Egress conduit, 64 is a rectangular shaped slot.

FIGS. 20, 21, 22, and 23 are full cross sections of devices showing various configurations of passages.

Figure 20:
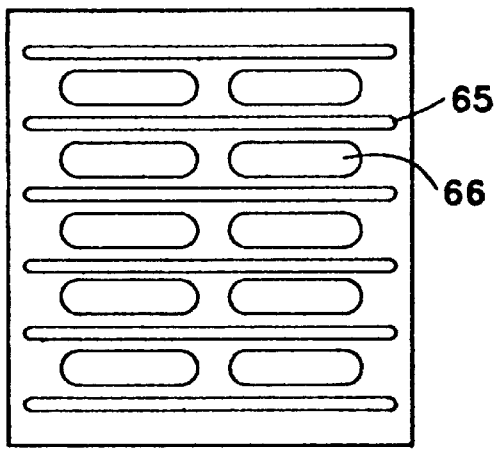
FIGS. 20, 21, 22, and 23 are schematic diagrams of cross sections of devices showing various configurations of passages.

FIG. 20 shows a structure with a rectangular exterior cross section, slot-like egress conduits, 65, and primary channels, 66. The egress conduits have a cross section of higher aspect ratio than the primary channels.

Figure 21:
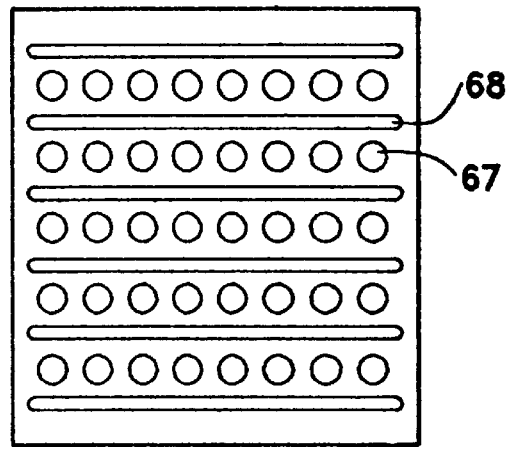

FIG. 21 shows a structure with a rectangular exterior cross section, round primary channels 67, and slot-like egress conduits, 68.

Figure 22:
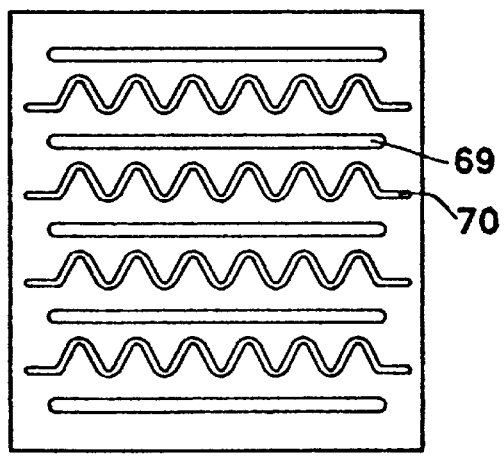

FIG. 22 shows slot-like egress conduits, 69, and wavy primary channels 70. The wavy primary channels provide high surface area and still few egress conduits. These devices can be used for separation and filtration. The egress conduits serve to reduce back pressure and improve permeance. These devices are suited for reactive processes where a reactive gas or liquid is provided through the egress conduits to the primary channels. The device allows for controlled insertion of reactive species into the primary channels. Some reactions that are especially suited for these devices are selective oxidation of hydrocarbons, e.g. methane to methanol, where an oxygen permeable membrane allows a controlled amount of oxygen to be fed into the reactive stream. In such a case, a catalyst can be provided within the primary channels to facilitate the oxidation reaction. The membrane consists of an oxygen permeable material such as LaO.2SrO.8FeO.6CoO.4Ox.

Figure 23:
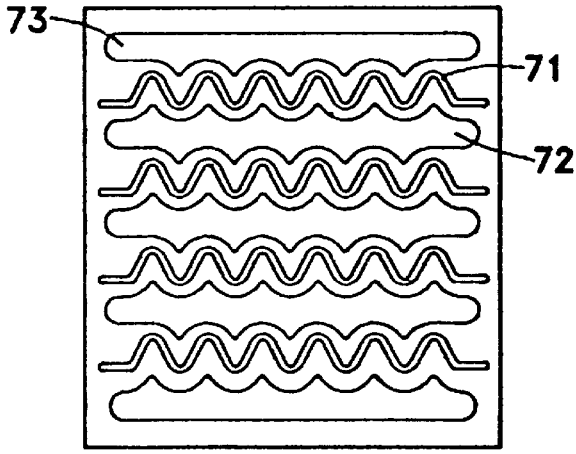

FIG. 23 shows both primary channels, 71, and egress conduits, 72, having irregular shapes. In this device, one set of passages is configured to at least one surface of the other set of passages. For example, surface 73 of the egress conduits is curved and shaped to the outer configuration of primary channels. This arrangement offers the advantage of having a minimal distance between primary channels and adjacent egress conduits, the result being that effluent from a given primary channel has a very short distance to travel to the adjacent egress conduit the advantage being more efficient removal of the output stream from the device. Also, the convoluted shapes of the primary channels allow more surface area.

In still another embodiment, the primary channels have a rectangular cross section and are parallel to the long axis of the extrudate in repeating rows. The structure also contains rectangular egress conduits parallel with, and lying between the rows of primary channels so that each row of primary channels lies adjacent to an egress conduit or adjacent to the exterior of the body. The cross sectional area of the egress conduits is greater than that of the primary channels. As means for manifolding the egress conduits, holes are drilled from the exterior of the structure, in a direction normal to the surface of the body and perpendicular to the plane of the egress conduit, so that the holes intersect all of the egress conduits.

Figure 24:
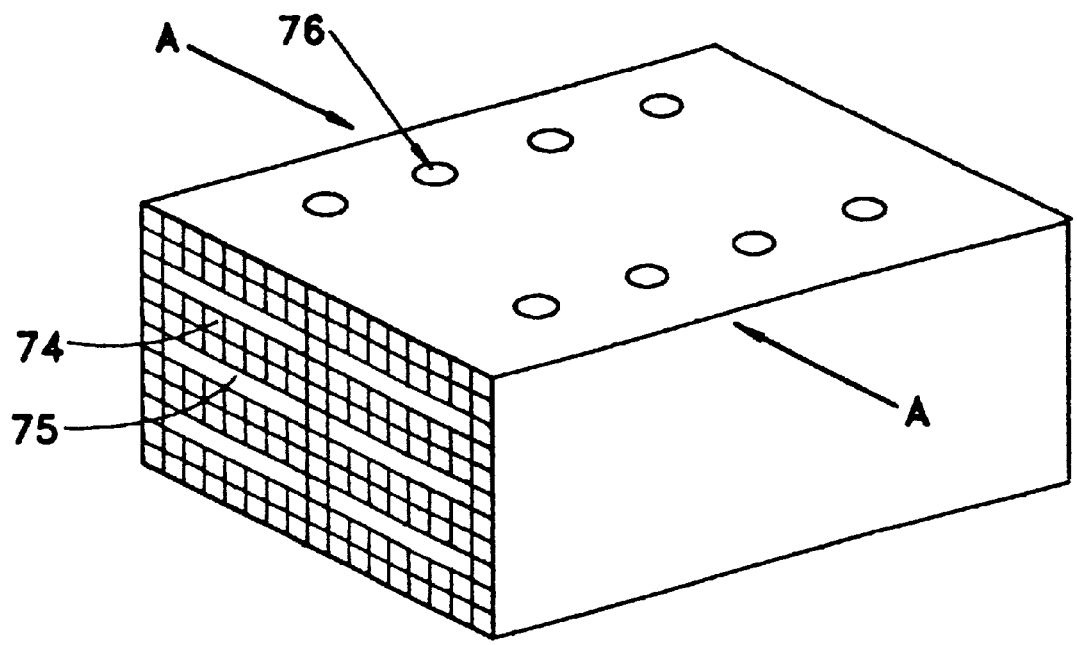
FIGS. 24 and 25 are schematic diagrams of rectangular devices having rectangular passageways.
Figure 24A:
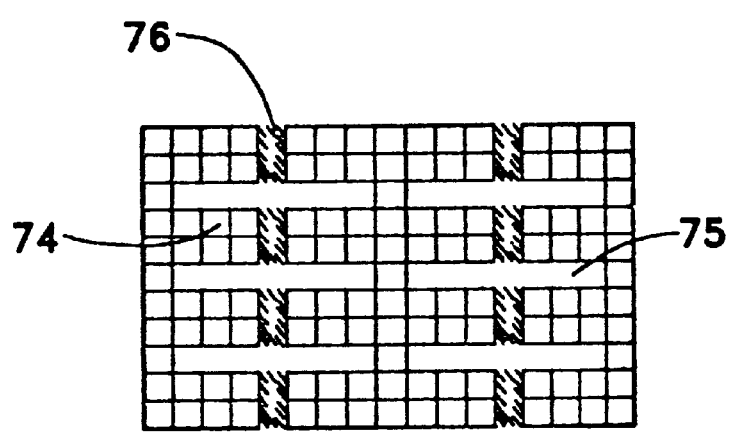
FIGS. 24a and 25a are schematic diagrams of cross sections of the devices of FIGS. 24 and 25 respectively.
Figure 25:
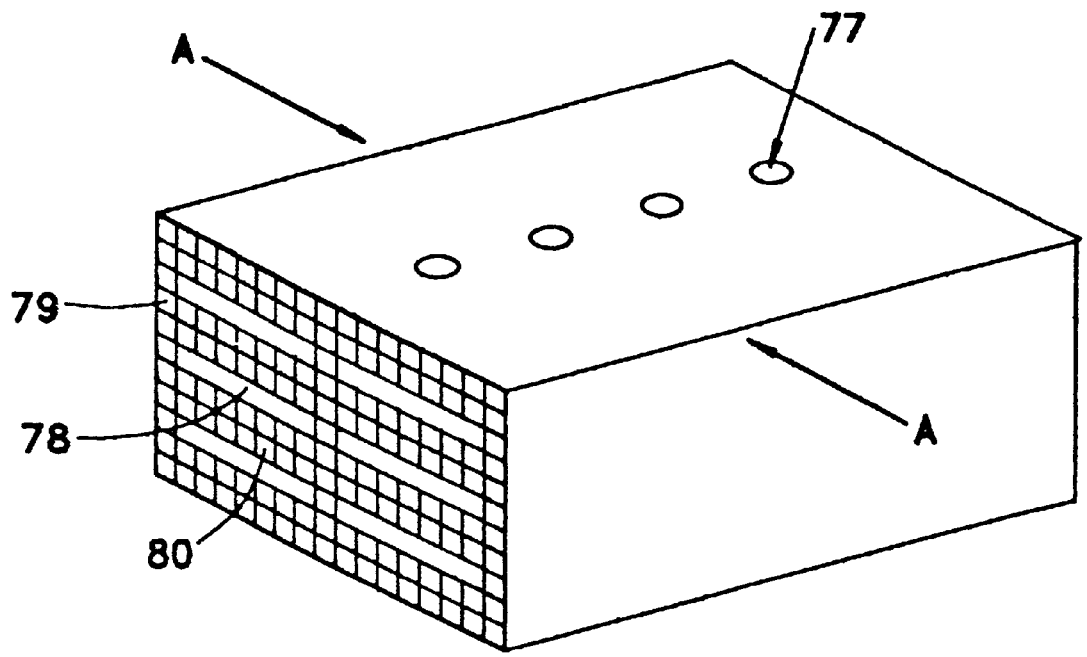
Figure 25A:
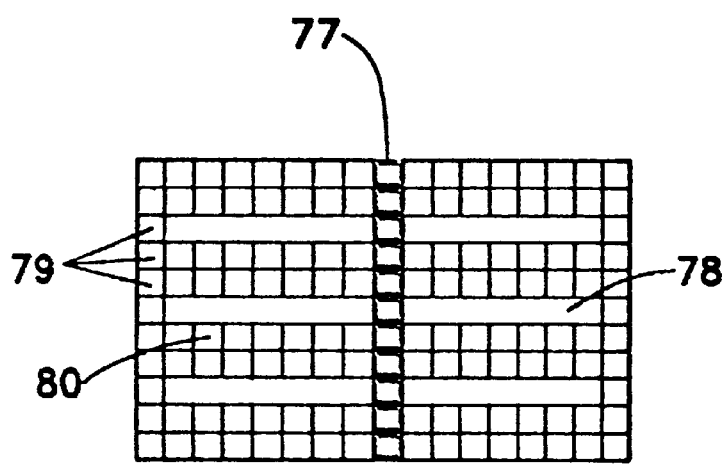

This embodiment is illustrated by the examples of FIGS. 24 and 25 with FIGS. 24a and 25a shown as respective cross sections. FIGS. 24 and 24a, a diagram of a cross section through section A—A, show a structure having all of the primary channels, 74, adjacent to the exterior of the structure, or to the egress conduits, 75. Means for manifolding is provided by holes, 76, which are drilled through the monolith and which intersect all of the egress conduits. The ends of the egress conduits are plugged so as to prevent contamination of the effluent with the input stream. FIG. 25 is similar to FIG. 24 except that the drill pattern is different. The drilled holes, 77, are along portions of the structure which hold open the egress conduits and facilitate extrusion. The examples of FIGS. 24, 24a, 25, and 25a illustrate two means of communication between the egress conduit and the exterior. The effluent can pass from the egress conduit, 78 in FIG. 25 and 25a, through a channel adjacent to the exterior, 79, or through a hole drilled from the exterior along pillars, 77, in FIG. 25 or 25a, or between pillaring elements, 76 in FIG. 24 or 24a. Primary channels in FIGS. 25 and 25a are shown as 80.

FIG. 26 is a schematic diagram of another useful extruded structure, 81. In this structure, the primary channels and egress conduits are slot-like. Egress conduits, 82, have a larger cross sectional aspect ratio than primary channels, 83. It can be seen at the front face of the structure, 84, that the egress conduits extent beyond the primary channels. This arrangement allows the egress conduits to be manifolded with each other and to communicate with the outside by notching the sides of the structure as shown in FIG. 26a. The notches, 85, are placed in the side of the structure to optimize removal of the outlet stream, eg. filtrate, permeate, etc. The ends of egress conduits are closed with a plug, 86. The porosity of the end surfaces of the unit, 87 and 87a is sealed. The structure would be installed in a manner such that one flow path would be along the extrusion axis, while the second would be perpendicular to this axis.

In a membrane separation application, an inlet workstream would enter the membrane-containing primary channels, some material will be retained on or reacted on the membrane. As the material passes through the channels, the membrane allows some of the mixture to pass through the egress conduits to exit the structure in a perpendicular direction. The closure of the egress conduits at either end of the structure ensures that material will flow perpendicularly and not enter the primary channels to mix with the inlet stream. The closure of the egress conduits at either end of the structure can be accomplished by plugging. The remaining material in the channels exits the structure through the outlet end of the channels. Both outlet streams can be collected in separate collection zones. In a membrane filtration operation, the amount of filtrate varies along the length of the filter. Therefore it is advantageous to adjust the slot position and frequency to minimize back pressure on the membrane in certain applications. The arrows in FIG. 26a indicate the direction of flow of a feed stock into, through and eventually out of the device.

To more fully illustrate the invention, the following non-limiting examples are presented. All parts, portions, and percentages are on a weight basis unless otherwise stated.

EXAMPLE

Figure 27:
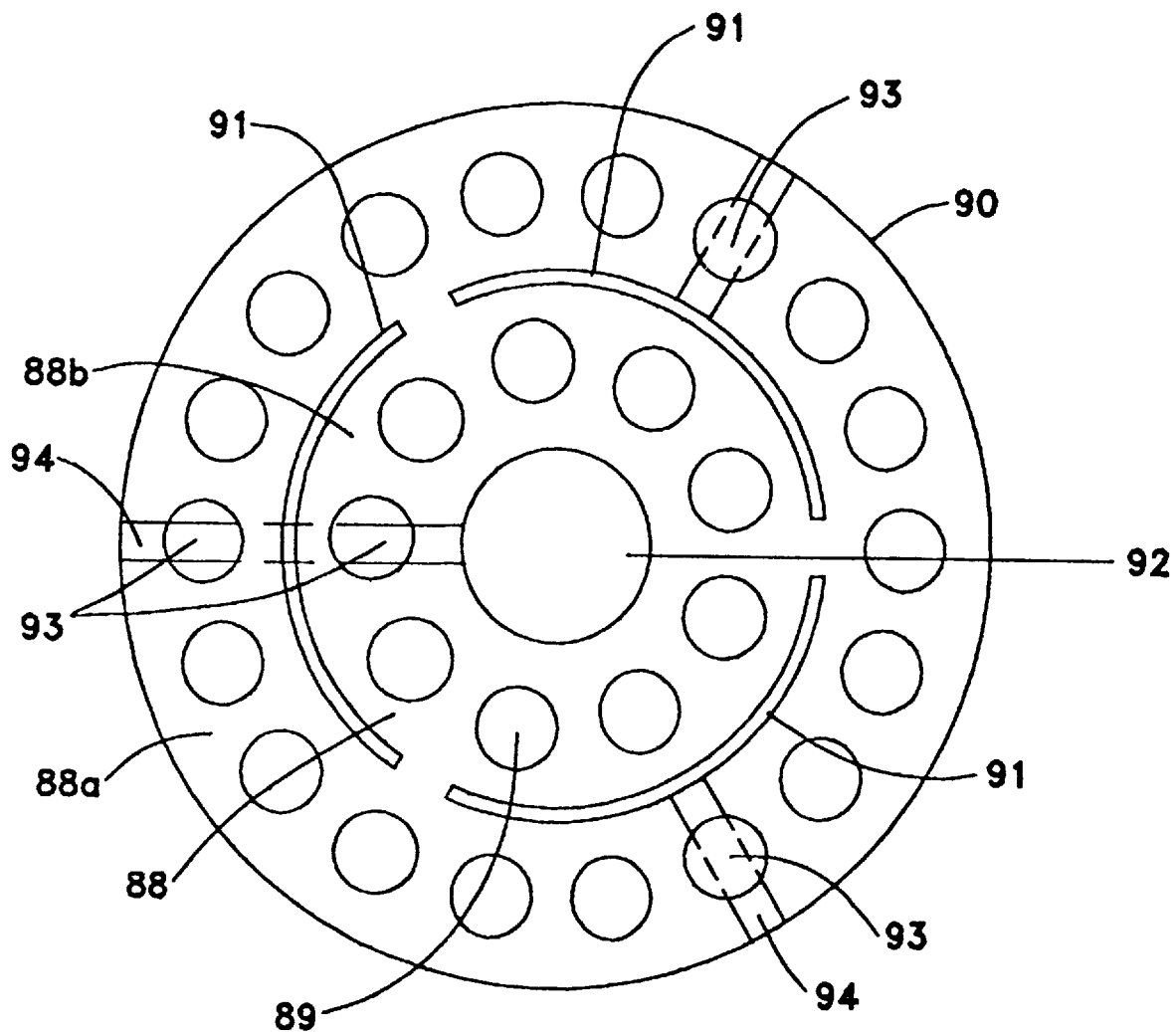
FIG. 27 is a cross section of a device having the primary channels arranged in two rings and having circular arc egress conduits.

A monolith of about 2.54 cm (about 1") in diameter, the cross section of which is shown in FIG. 27, with 2 rings, 88a and 88b, with 27 passageways, 89, and having an inner diameter of about 2.5 mm, 18 passages in the outer ring, 88a, and 9 passages in the inner ring, 88b, was extruded and fired. The distance between adjacent passageways was about 1.1 mm. The distance between the passages and the adjacent egress conduit, as shown by 88, was about 0.8 to 0.95 mm. For example this distance relates to distance between the passages in the inner ring and either the central conduit or the adjacent egress conduit, 91. This is also the distance between a channel in the outer ring and egress conduit, 91. The outer skin, 90, was about 1.5 mm thick. Fired substrates of the composition used had a mean pore diameter of about 0.4 microns and a volume porosity of about 44%. The truncated circular arc conduits, 91, the central circular cross section conduit, 92, and the four dummy holes or passageways, 93, were plugged at their ends using an epoxy, and the monolith was sealed at both ends with an impermeable polymer to prevent mixing of feed and permeate. The fired monolith was tested with $CO_2$ gas and a pressure drop of about 10 psi across from feed to permeate side. Holes, 94, were drilled (through the dummy passages) to allow communication between the filtrate conduits and the exterior, and the sample was tested again.

The results of the tests are given in Table 1 below.

TABLE 1

|  | delta P cm Hg | Flux scc/cm2 | Permeance scc/cm2/sec/cm Hg |
| --- | --- | --- | --- |
| Not Drilled | 53.3 | 0.192 | 0.00361 |
| Drilled | 36.7 | 0.636 | 0.01733 |

The permeance of the monolith before drilling was about ⅕ the value afterwards. This was due to two factors. First, the outer wall was 60 to 90% thicker than the inner walls and thus the permeance of the outer portion of the outer passageways was less than the permeance of the inner passageways. This would account for less than half of the effect. More significantly, before the holes were drilled, the gas had to pass between the passageways in the outer ring in order to exit the body. But this was restrictive enough to virtually eliminate the contribution of the inner ring, and to a lesser extent, the inner surface of the outer ring, to the total flux. After the holes were drilled, all of the surface area became useful and a dramatic five fold increase in permeance was seen. An undrilled monolith is morphologically similar to a body with 3 rows of passageways between filtrate conduits. This result suggests that monoliths with 3 rows of passageways between filtrate conduits are less desirable than monoliths with two or one row of passages. This is amplified for small pore diameter materials.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A device for altering a feed stock, the device comprising a structure for passage of a feed stock therethrough to produce an altered feedstock, the structure being selected from the group consisting of an extruded unibody structure, and a nested structure, the structure comprising an interior and an exterior section, and a longitudinal axis, and walls defining two sets of open-ended passages which extend along the longitudinal axis, the device having means for isolating one set of passages from the feed stock, all the passages being slot-like in cross section, said two sets of passages having cross sectional aspect ratios that are different with respect to each other the passages with the larger cross sectional aspect ratio being closer to the exterior of the structure than the passages with the smaller cross sectional aspect ratio, the passages with the larger cross sectional aspect ratio being manifolded by notches cut into the sides of the structure, and having plugs at both ends, each passage of one set lying immediately adjacent to at least one passage of the other set or to the exterior of the structure, one set of passages for receiving and altering a feedstock, which thereafter passes out of the walls of said one set of passages, and the other set of passages for receiving and discharging the resulting altered feedstock, wherein when the structure is a nested structure, at least some of the passages have a cross section in the shape of truncated arcs.

2. A device of claim 1 wherein the cross sectional aspect ratio of the passages of one set is greater than about 3.

3. A device of claim 1 wherein the distance between the passages of one set exceeds the distance between said passages and an adjacent passage of the other set.

4. A device of claim 1 wherein each passage of one set of passages is configured to match at least one surface of each passage of the other set of passages, the matching surfaces lying adjacent to one another.

5. A device of claim 1 wherein the passages with the smaller aspect ratio have a membrane thereon.

6. A device of claim 1 additionally comprising a membrane on the walls of the passages of one set.

7. A device of claim 6 wherein the membrane is a gas permeable membrane.

8. A device of claim 7 wherein one set of passages has a catalyst.

9. A device of claim 8 wherein the set of passages without the membrane has an oxidation catalyst.

10. A device claim 1 wherein the structure is made of material selected from the group consisting of ceramic, glass, glass-ceramic, metal, carbon, molecular sieve, polymers, ion exchange resins, and combinations thereof.

11. A method of altering a feed stock, the method comprising:
  a) passing a feed stock into the device of claim 1 through one set of passages of said device to cause an altering of the feed stock; and thereafter
  b) passing the output stream resulting from step a into and through the other set of passages of said device to the exterior of said device.

12. A method of claim 11 wherein the feed stock is passed through the device of claim 6, wherein the feedstock is altered by passage through the membrane of said device.

13. A method of altering a feedstock which comprises oxidizable components, the method comprising:

a) providing a device for altering a feed stock, which comprises a structure for passage of a feed stock therethrough, the structure being selected from the group consisting of an extruded unibody structure, and a nested structure, the structure comprising an interior and an exterior section, and a longitudinal axis, and walls defining two sets of open-ended passages which extend along the longitudinal axis, the device having means for isolating one set of passages from the feed stock, said two sets of passages having different cross sectional shapes or dimensions with respect to each other, each passage of one set lying immediately adjacent to at least one passage of the other set or to the exterior of the structure, wherein when the structure is a nested structure, at least some of the passages have a cross section in the shape of truncated arcs, wherein the walls of one set of passages have a gas-permeable membrane and the walls of the other set of passages have a catalyst;

b) passing oxygen through the membrane-containing passages of the device to cause a controlled amount of oxygen to pass through said membrane into the catalyst-containing passages and at the same time;

c) passing a feedstock comprising oxidizable components into the catalyst-containing passages of the device to cause oxidation of at least some of said oxidizable components; and thereafter d) passing the output streams out of the device.

* * * * *